United States Patent [19]

Onuma et al.

[11] Patent Number: 6,031,691
[45] Date of Patent: Feb. 29, 2000

[54] MAGNETORESISTANCE EFFECT MAGNETIC HEAD AND MANUFACTURING METHOD THEREFOR

[75] Inventors: Kazunori Onuma; Akira Murakami, both of Miyagi, Japan

[73] Assignee: Sony Corporation, Tokyo, Japan

[21] Appl. No.: 08/873,105

[22] Filed: Jun. 11, 1997

[30] Foreign Application Priority Data

Jun. 13, 1996 [JP] Japan .................................. 8-152539

[51] Int. Cl.[7] ........................................................ G11B 5/39
[52] U.S. Cl. ............................................................. 360/113
[58] Field of Search ............................................. 360/113

[56] References Cited

U.S. PATENT DOCUMENTS

| | | | |
|---|---|---|---|
| 3,987,485 | 10/1976 | Sugaya et al. ......................... | 360/113 |
| 5,296,987 | 3/1994 | Anthony et al. ....................... | 360/113 |
| 5,875,078 | 2/1999 | Suyama et al. ........................ | 360/113 |

*Primary Examiner*—Robert S. Tupper
*Attorney, Agent, or Firm*—Hill & Simpson

[57] ABSTRACT

A magnetoresistance effect magnetic head which is capable of shortening shield gap distance and which can be manufactured by a small number of manufacturing steps, and a manufacturing method therefor are provided. The magnetoresistance effect magnetic head having a magnetoresistance effect magnetic device held between a pair of soft magnetic members through insulating layers and conductors connected to the magnetoresistance effect magnetic device is structured such that the conductors are embedded in grooves formed in the insulating layer. Since the magnetoresistance effect magnetic device has the structure such that the conductors connected to the magnetoresistance effect magnetic device are embedded in the grooves formed in the insulating layer, the shield gap distance can be shortened.

5 Claims, 22 Drawing Sheets

MAGNETORESISTANCE EFFECT MAGNETIC HEAD AND MANUFACTURING METHOD THEREFOR

BACKGROUND OF THE INVENTION

1. Field of the Invention

The present invention relates to a magnetoresistance effect magnetic head for a high density digital recording and reproducing apparatus, such as a digital tape recorder or a data storage, and to a manufacturing method therefor.

2. Description of Prior Art

In recent years, the recording density realized by magnetic recording has been raised, thus resulting in that a demand for a thin film magnetic head being heightened which is able to advantageously reduce the width of the track, lower the inductance and raise the transfer rate to be adaptable to the raised recording density as compared with the conventional bulk type magnetic head which has been used widely.

Since the thin film magnetic head is, similarly to a semiconductor integrated circuit, manufactured by using a film forming technology, such as evaporation and sputtering, and a photolithography technology, such as a photomechanical process and etching, a multiplicity of thin film magnetic heads can collectively and accurately be manufactured on one wafer. Thus, the thin film magnetic head can satisfactorily be mass-produced. Therefore, the thin film magnetic head is expected to be mainly used as a magnetic head employed in a magnetic recording apparatus, such as a hard disk drive.

In the above-mentioned circumstance, also the thin film magnetic head is required to have improved performance to be adaptable to the further raised recording density. To improve the performance, a magnetic head has been researched and developed which has a structure formed by combining an inductive thin film magnetic head and a magnetoresistance effect magnetic head (hereinafter called as a "MR head") to record an information signal by using the inductive thin film magnetic head and to reproduce an information signal by using the MR head. Moreover, a combined type thin film magnetic head, having a structure arranged such that the inductive thin film magnetic head and the MR head are formed on one substrate thereof, has been put into practical use.

The MR head is a magnetic head using the magnetic resistance effect of a magnetoresistance effect magnetic device (hereinafter called as an "MR device") to reproduce a recorded signal. The MR head is different from a usual magnetic induction type magnetic head, that is, a magnetic head having a structure in which a wire is wound around a magnetic core, in that the output reproduced from the MR head does not depend upon the relative speed from a recording medium. Namely, the MR head is able to obtain a satisfactorily large output even from a relatively low speed system. Therefore, the MR head is considered to be an essential device for realizing higher density recording and reproducing.

The MR head is mainly classified into a non-shield MR head structured such that the two side surfaces of the MR device are held by non-magnetic members; a shield MR head structured such that the two side surfaces of the MR device are shielded by soft magnetic members for the purpose of improving the reproduction frequency characteristic of the non-shield MR head; and a yoke type MR head structured such that magnetic flux from a recording medium is introduced into the MR device and the MR device is formed into a non-exposed type structure in order to stabilize various characteristics, such as wear resistance. Among the above-mentioned MR heads, the shield MR head has been made most practical. The reason for this is that the shield MR head has a frequency characteristic superior to that of the non-shield MR head and thus excellent resolution can be obtained. Moreover, the shield MR head can easily be manufactured as compared with the yoke type MR head and large reproduction output can be obtained.

The shield MR head is classified into a lateral type head in which a sense current flows in the widthwise direction of the track and a vertical type head in which the sense current flows perpendicular to the widthwise direction of the track. At present, the lateral type shield MR head is mainly used.

The conventional lateral type shield MR head has a structure arranged as shown in FIGS. 1 to 4. FIG. 1 is a plan view showing a circuit pattern of the lateral type shield MR head, and FIG. 2 is a cross sectional view taken along line I–I' shown in FIG. 1. FIG. 3 is a cross sectional view taken along line J–J' shown in FIG. 1. FIG. 4 is a schematic perspective view showing the conventional lateral type shield MR head.

As shown in FIGS. 1 to 4, the lateral type shield MR head is composed of a MR device portion 105 consisting of a first soft magnetic substrate 101, an insulating layer 102 formed on the first soft magnetic substrate 101, a MR device 103 and a biasing conductor 104 formed on the insulating layer 102; a pair of conductors 106 and 107 extending from the two lengthwise directional ends of the MR device portion 105; an insulating layer 108 formed on the MR device portion 105 and the conductors 106 and 107; and a second soft magnetic substrate 110 connected to the upper surface of the insulating layer 108 by an adhesive agent 109.

The biasing conductor 104 is provided for the purpose of applying a bias magnetic field to the MR device 103, the biasing conductor 104 being formed on the MR device 103. The MR device portion 105 formed by laminating the MR device 103 and the biasing conductor 104 is disposed in such a manner that its longitudinal direction runs parallel to a surface M facing a recording medium. Moreover, one of the ends of the MR device portion 105 is ground so as to be exposed to the surface M facing the recording medium.

When an information signal is reproduced from the recording medium by using the above-mentioned MR head, a sense electric current is supplied to the MR device portion 105 through the conductors 106 and 107. As a result, the sense electric current flows in the lengthwise direction of the MR device portion 105 along the surface M facing the recording medium.

In the above-mentioned MR head, it is preferable that each of the conductors 106 and 107 has small electric resistance because the sense electric current is supplied to the MR device portion 105 through the conductors 106 and 107. Since the portions of the conductors 106 and 107 which are connected to the MR device portion 105 are exposed to the surface M facing the recording medium and thus the portions come in contact with the outside air, the portion must have environment resistance.

Accordingly, the conductors 106 and 107 are divided into portions which are exposed to the surface M facing the recording medium and thus brought into contact with the outside air and portions which do not exposed to the surface M facing the recording medium and thus they are not brought into contact with the outside air, the divided portions being made of different materials.

That is, the conductors 106 and 107 are composed of first conductors 106a and 107a extending from two lengthwise directional ends of the MR device portion 105 and second conductors 106b and 107b extending from the rear ends of the first conductors 106a and 107a.

Since the first conductors 106a and 107a are exposed to the surface M facing the recording medium and thus they are brought into contact with the outside air, the first conductors 106a and 107a must have satisfactory environment resistance rather than the electric characteristics. Thus, the first conductors 106a and 107a are made of metal having a high melting point to have satisfactory environment resistance. On the other hand, since the second conductors 106b and 107b are not exposed to the surface M facing the recording medium and thus they are not brought into contact with the outside air, the second conductors 106b and 107b must have satisfactory electric characteristics rather than the environment resistance. Therefore, the second conductors 106b and 107b are made of a conductive material having a small specific resistance.

When the lateral type shield MR head is manufactured, the first step is performed such that the insulating layer 102 is, by sputtering or the like, formed on the first soft magnetic substrate 101. Then, the MR device 103 and the biasing conductor 104, for applying the bias magnetic field to the MR device 103, are formed on the insulating layer 102. Then, the foregoing elements are formed to have predetermined shapes by photolithography so that the MR device portion 105 is formed.

Then, the first conductors 106a and 107a are formed to extend from the two ends of the MR device portion 105 to cover the upper surface of the insulating layer 102, that is, to extend from the two lengthwise directional ends of the MR device portion 105. Then, the second conductors 106b and 107b are laminated on the rear portions of the first conductors 106a and 107a.

As described above, the first conductors 106a and 107a and the second conductors 106b and 107b for supplying the sense electric current to the MR device portion 105 are made such that the first conductors 106a and 107a are made of the material having excellent environment resistance and the second conductors 106b and 107b are made of the material having small specific resistance.

Then, the insulating layer 108 is formed on the overall surface, and then the second soft magnetic substrate 110 are connected to the insulating layer 108 by the adhesive agent 109. The second soft magnetic substrate 110 is connected in such a manner that portions of the rear ends of the second conductors 106b and 107b are exposed to serve as electrodes for establishing the connection with the outside.

After the above-mentioned processes have been completed, a grinding process for grinding the surface M facing the recording medium to expose the MR device portion 105 to the surface M facing the recording medium is performed, and then a terminal forming process is performed such that terminals for establishing the connection with the outside are formed in the electrode portions at the rear ends of the second conductors 106b and 107b. As a result, the above-mentioned lateral type shield MR head can be manufactured.

The frequency characteristics of the lateral type shield MR head having the above-mentioned structure are determined by shield gap distance g between the first soft magnetic substrate 101 and the second soft magnetic substrate 110. The frequency characteristics are improved in inverse proportion to the shield gap distance g. Thus, an information signal having a higher density can be reproduced.

Since the shield MR head has the structure such that the MR device 103, the biasing conductor 104 and the conductors 106 and 107 are held between the first soft magnetic substrate 101 and the second soft magnetic substrate 110, the shield gap distance g is mainly determined by the thicknesses of the MR device 103, the biasing conductor 104 and the conductors 106 and 107. Since the conductors 106 and 107 have the largest thickness in general, the shield gap distance g is determined by the thickness of the conductors 106 and 107.

Therefore, it is preferable for the shield MR head that the thickness of the conductors 106 and 107 be reduced to shorten the shield gap distance g. However, since reduction in the thickness of the conductors 106 and 107 results in the electric resistance of each of the conductors 106 and 107 being enlarged, the load of a sense electric current circuit for controlling the sense electric current which is supplied to the MR device portion 105 is made to be heavier and the impedance is as well as enlarged. As a result, noise level is raised unsatisfactorily. Therefore, the shield MR head having the above-mentioned structure encounters a difficulty in reducing the thickness of the conductors 106 and 107. Thus, the shield gap distance g cannot be made to be a satisfactory value.

To solve the above-mentioned problem, a shield MR head having a structure arranged as shown in FIGS. 5 and 6 has been suggested. FIG. 5 is a plan view showing a pattern of a circuit in the shield MR head, and FIG. 6 is a cross sectional view taken along line K–K' shown in FIG. 5.

The foregoing shield MR head has a structure such that a portion of the insulating layer 108, formed on the overall surface after the first conductors 106a and 107a and the second conductors 106b and 107b have been formed, is etched, the portion being a portion formed on the first conductors 106a and 107a. Thus, the thickness of the insulating layer 108 is reduced in order to prevent projection of the insulating layer 108 over the first conductors 106a and 107a. As a result, the influences of the first conductors 106a and 107a and the second conductors 106b and 107b on the shield gap distance g can be limited. Thus, the shield gap distance g can be reduced. As described above, the shield MR head of the foregoing type is able to reduce the shield gap distance g so that a relatively satisfactory frequency characteristic is obtained.

However, the shield MR head shown in FIGS. 5 and 6 must have a process for etching the portions of the insulating layer 108 on the first conductors 106a and 107a, the insulating layer 108 being formed on the overall surface after the second conductors 106b and 107b have been formed. Thus, there arises a problem in that the number of manufacturing steps cannot be reduced. That is, the above-mentioned shield MR head must have the etching process using the photolithography after the insulating layer 108 has been formed. As a result, the number of manufacturing step is unintentionally increased.

SUMMARY OF THE INVENTION

In view of the foregoing, an object of the present invention is to provide a MR head which is capable of shortening the shield gap distance and which can be manufactured by a small number of manufacturing processes.

In order to achieve the above-mentioned object, according to one aspect of the present invention, there is provided a MR head having a magnetoresistance effect magnetic device held between a pair of soft magnetic members through insulating layers and conductors connected to the magnetoresistance effect magnetic device and structured such that the conductors are embedded in grooves formed in the insulating layer.

The MR head according to the present invention has a structure such that one of the soft magnetic members is bonded to the insulating layer with, for example, adhesive agent.

It is preferable that the MR head has a structure such that a second conductor having specific resistance weaker than that of the conductor is connected to the conductor.

It is preferable that the MR head has a structure such that magnetic layers are formed at the two ends of the magnetoresistance effect magnetic device. The magnetic layer in the foregoing structure may have, for example, conductivity and structured to restrict the width of the track by the distance between one of the magnetic layers and the other magnetic layer.

Since the MR head according to the present invention has the structure such that the conductors connected to the magnetoresistance effect magnetic device are embedded in the grooves formed in the insulating layer, the shield gap distance can be shortened.

According to another aspect of the present invention, there is provided a method of manufacturing a MR head having a magnetoresistance effect magnetic device held between a pair of soft magnetic members through insulating layers and conductors connected to the magnetoresistance effect magnetic device, the method of manufacturing a MR head comprising the steps of etching the insulating layer to form grooves when the conductors are formed, and forming the conductors in the grooves.

The method of manufacturing the MR head is structured such that one of the soft magnetic members is bonded to the insulating layer with, for example, adhesive agent.

It is preferable that the method of manufacturing a MR head be structured such that a second conductor having specific resistance weaker than that of the conductor is formed after the conductor has been formed in such a manner that the second conductor is connected to the conductor.

It is preferable that the method of manufacturing a MR head is structured such that magnetic layers are formed at the two ends of the magnetoresistance effect magnetic device after the magnetoresistance effect magnetic device has been formed. A structure may be employed in which the distance between the two magnetic layers is used to restrict the width of the track.

Since the method of manufacturing a MR head according to the present invention has a structure such that the grooves are formed in the insulating layer and the conductors connected to the magnetoresistance effect magnetic device are formed so as to be embedded in the grooves, the shield gap distance can be shortened.

Other objects, features and advantages of the invention will be evident from the following detailed description of the preferred embodiments described in conjunction with the attached drawings.

DETAILED DESCRIPTION OF THE INVENTION

Embodiments of a MR head according to the present invention will now be described with reference to the drawings. Note that the present invention is not limited to the following description and arbitrary change in the shape, materials and so forth without departing from the scope of the present invention.

First Embodiment

Figure 1:
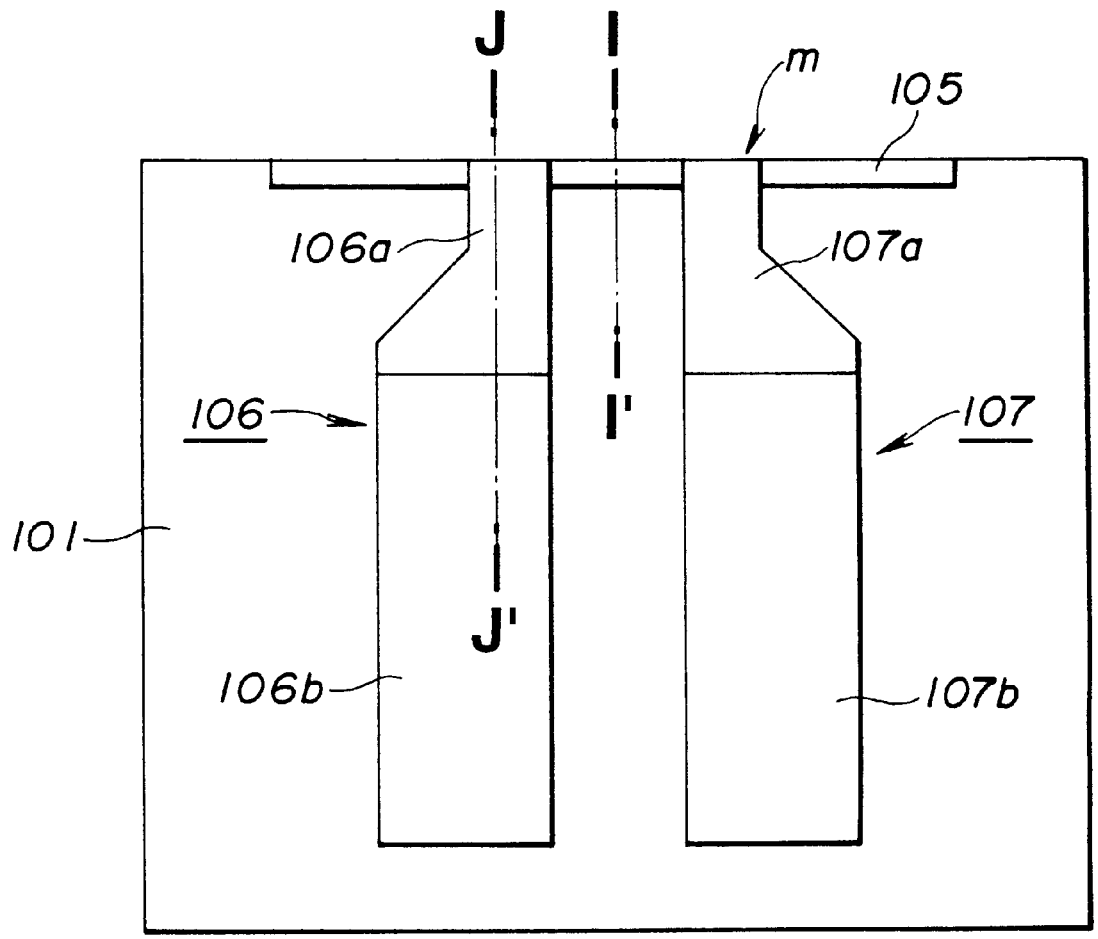
FIG. 1 is a plan view schematically showing a pattern of a circuit in a conventional MR head.
Figure 2:
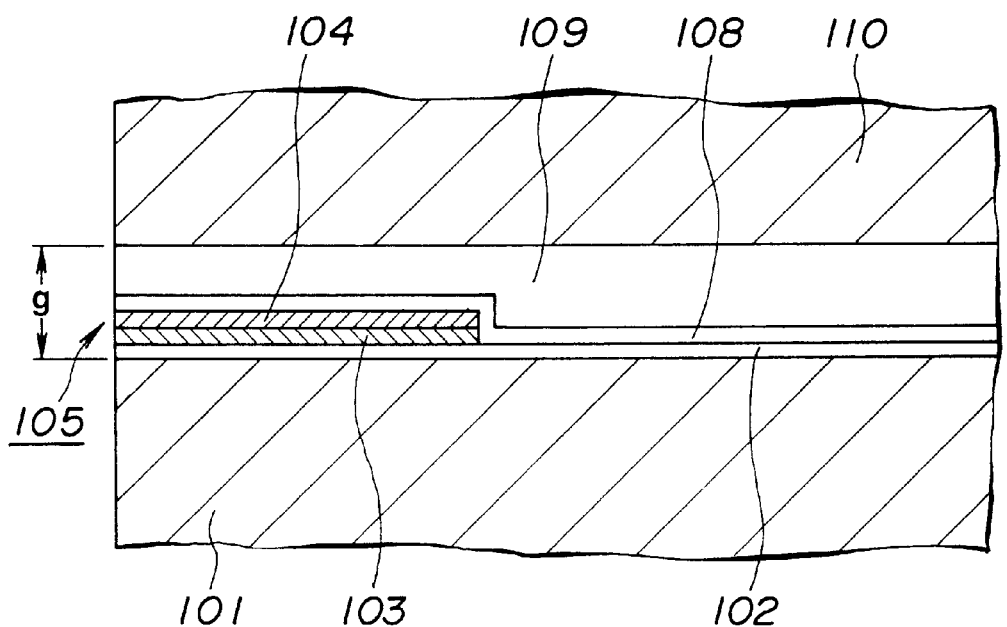
FIG. 2 is a cross sectional view taken along line I–I' shown in FIG. 1 and illustrating the MR head shown in FIG. 1.
Figure 3:
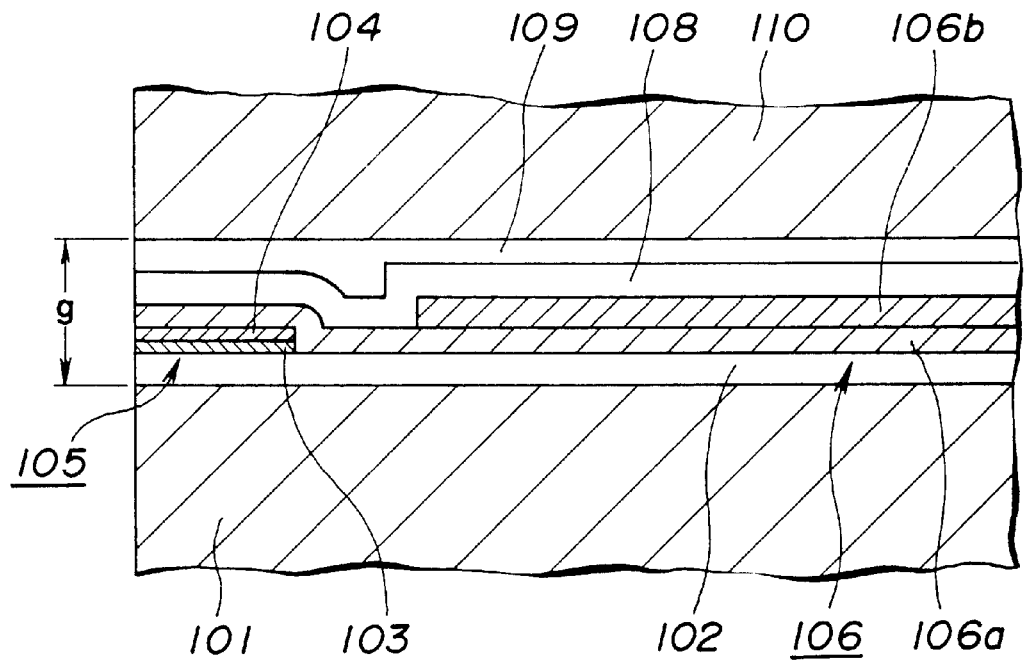
FIG. 3 is a cross sectional view taken along line J–J' shown in FIG. 1 and illustrating the MR head shown in FIG. 1.
Figure 4:
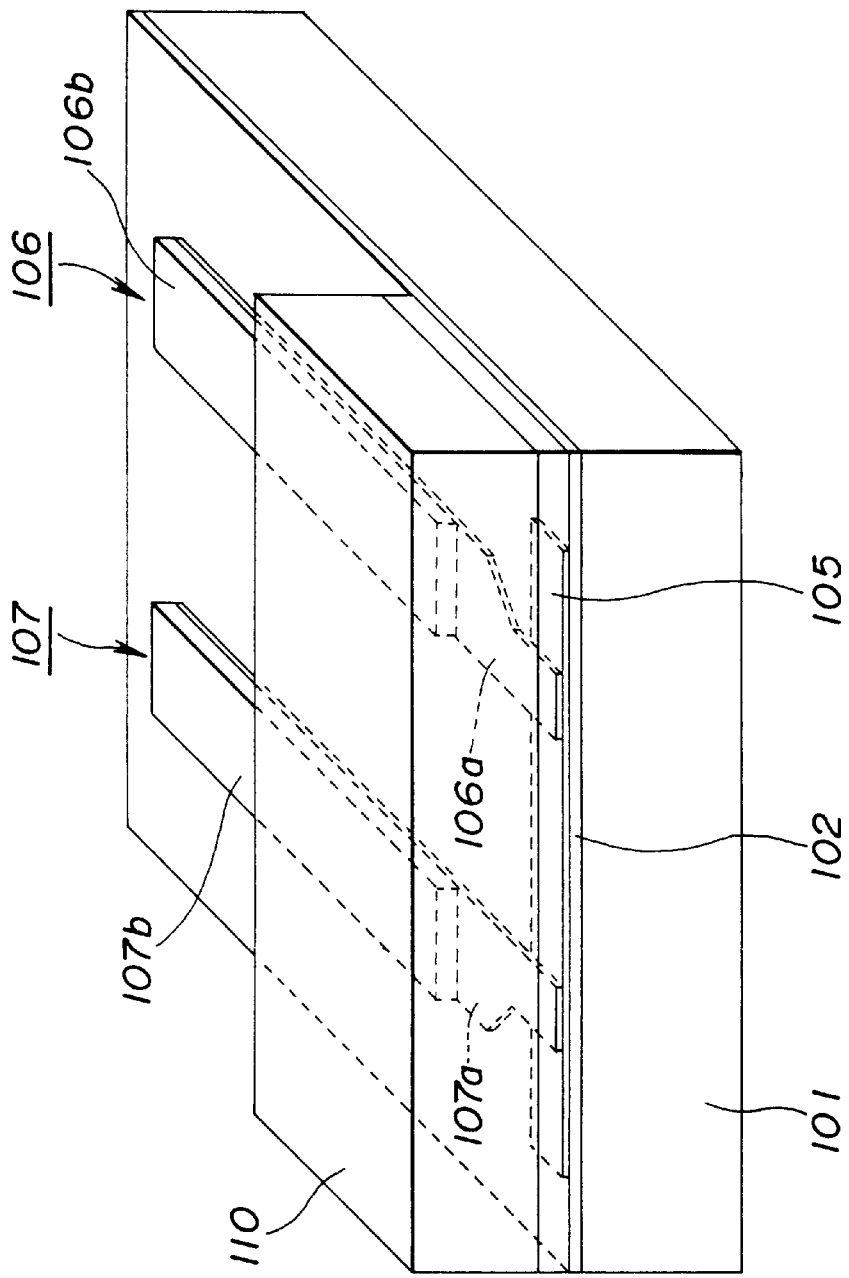
FIG. 4 is a schematic perspective view showing the MR head shown in FIG. 1.
Figure 5:
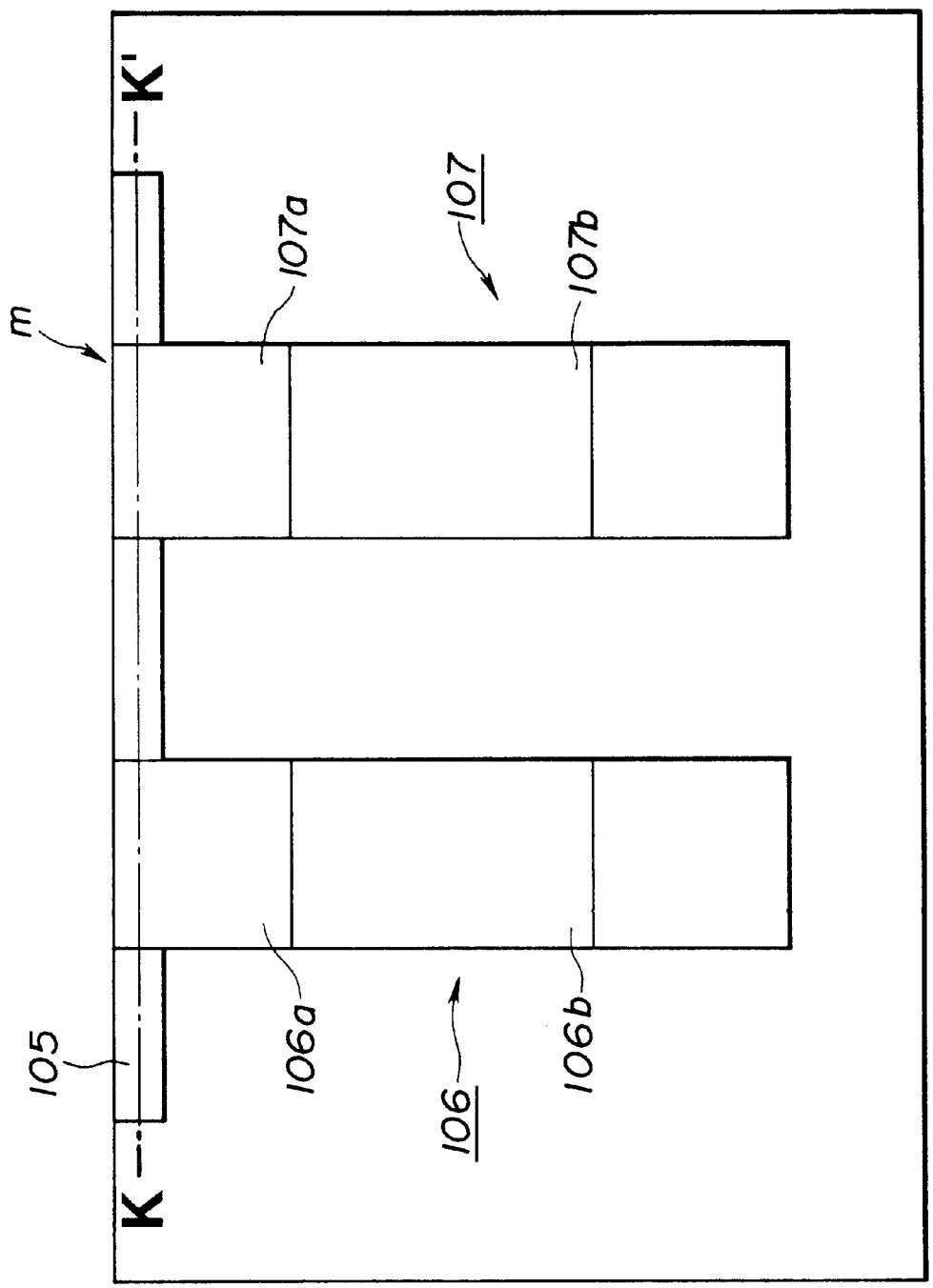
FIG. 5 is a plan view schematically showing a pattern of a circuit in another conventional MR head.
Figure 6:
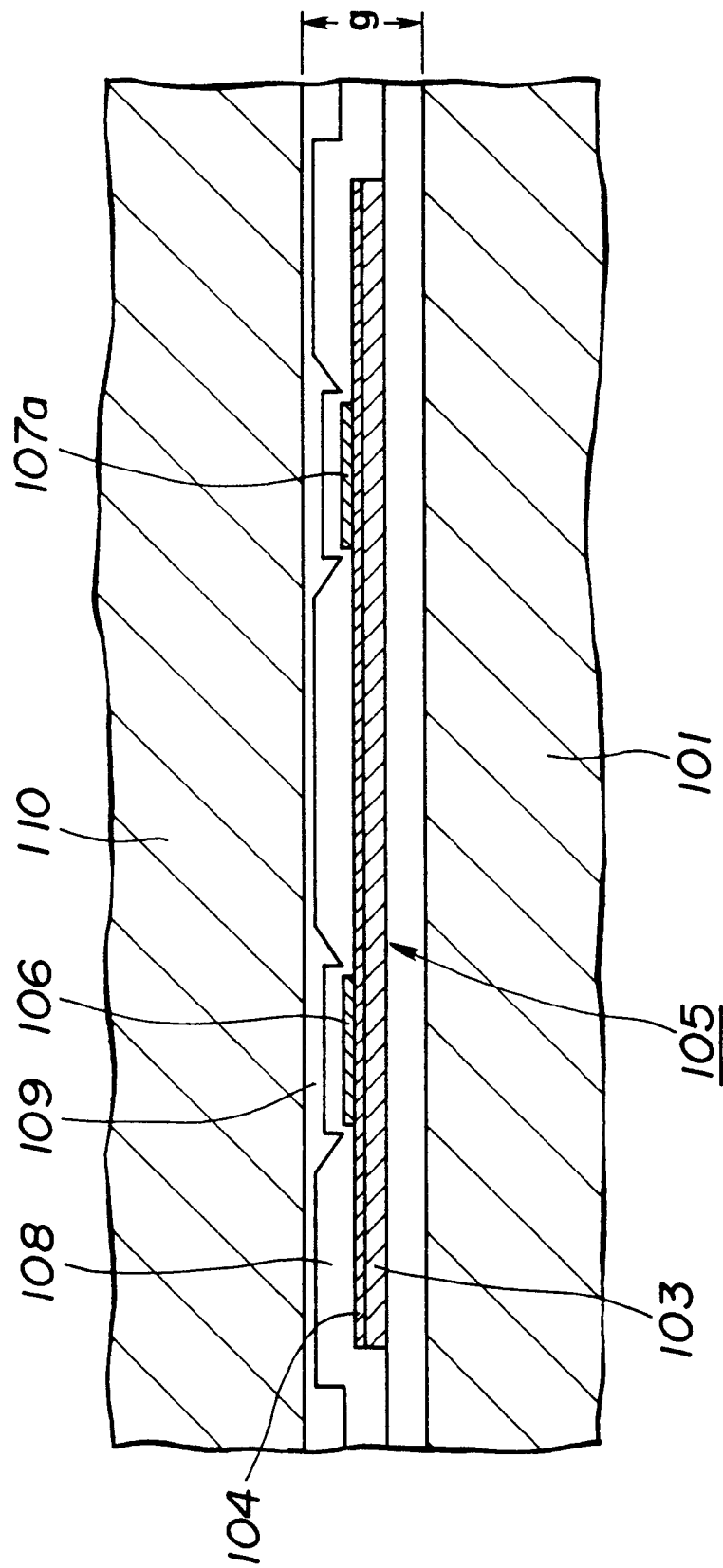
FIG. 6 is a cross sectional view taken along line K–K' shown in FIG. 5 and illustrating the MR head shown in FIG. 5.
Figure 7:
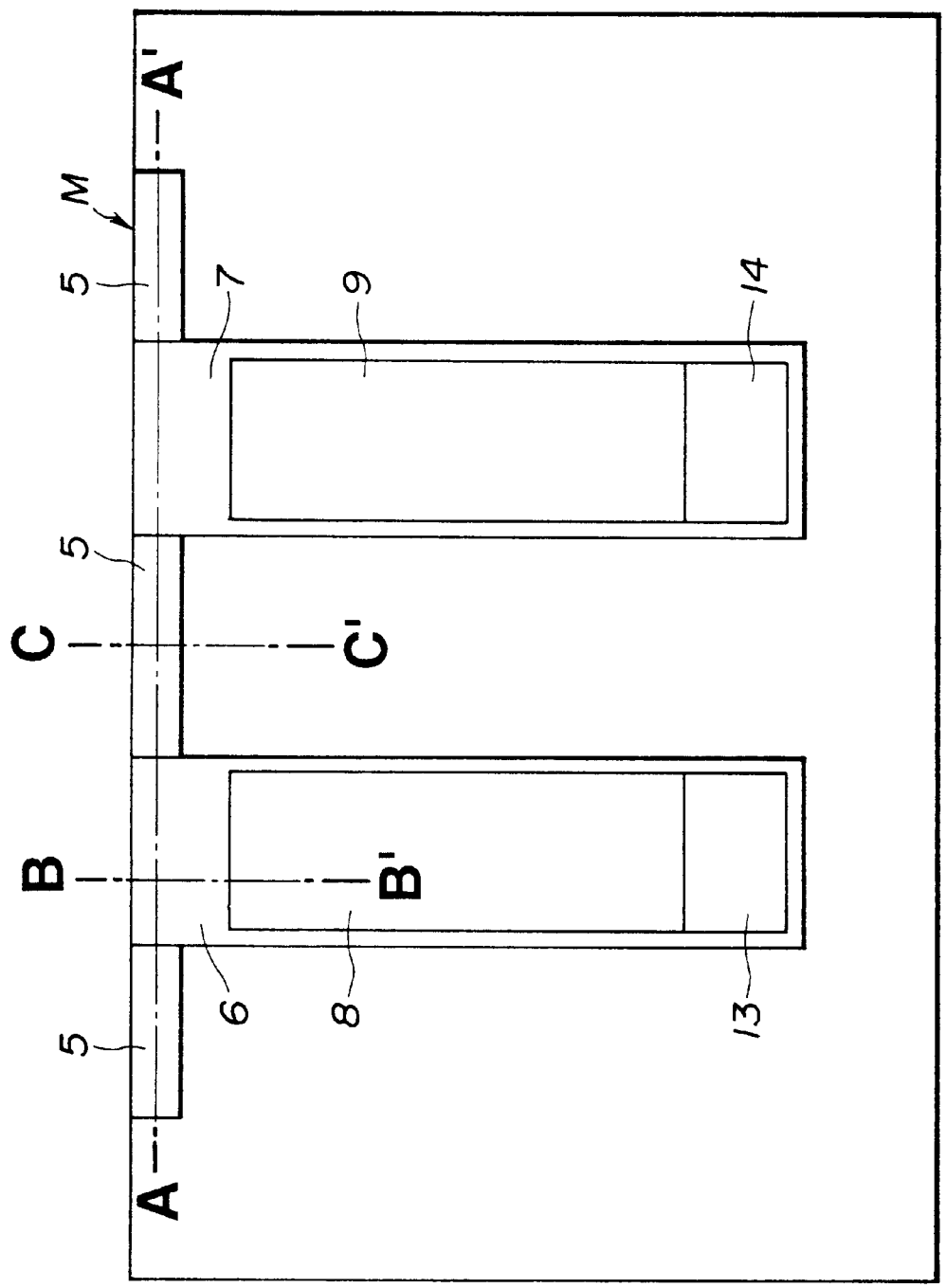
FIG. 7 is a plan view schematically showing a pattern of a circuit in a MR head according to the first embodiment.
Figure 8:
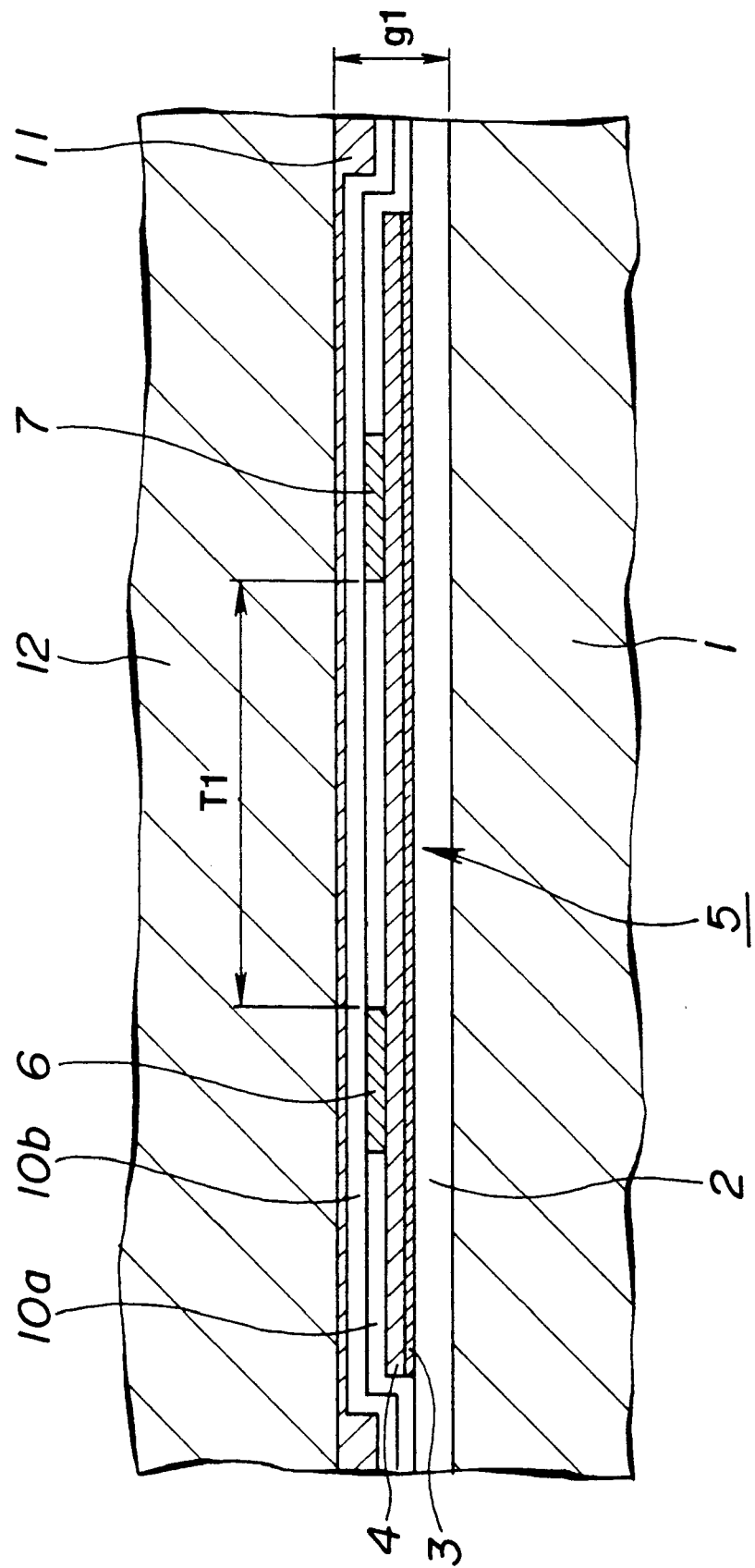
FIG. 8 is a cross sectional view taken along line A–A' shown in FIG. 7 and illustrating the MR head according to the first embodiment.
Figure 9:
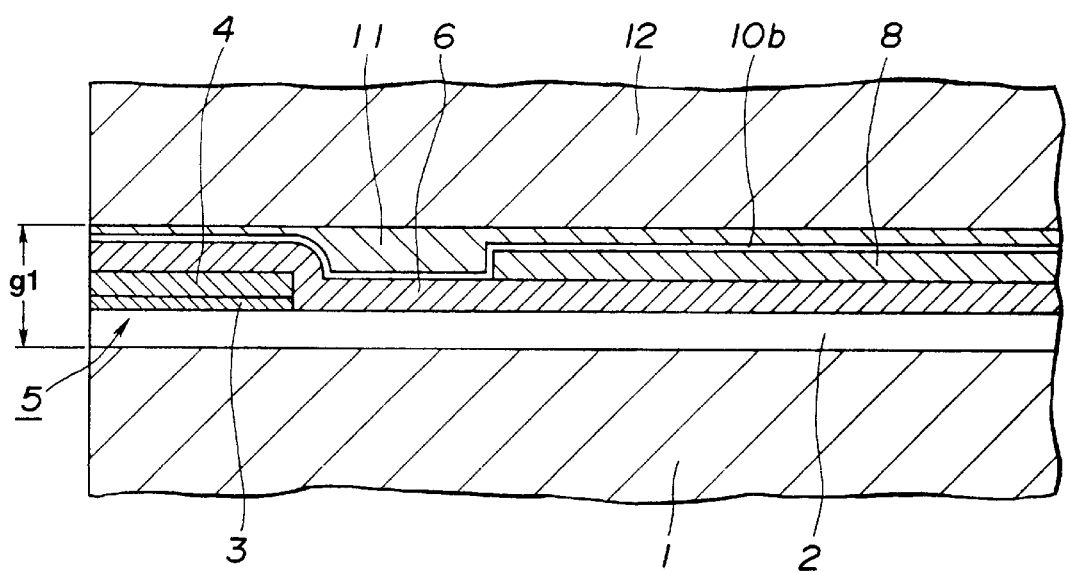
FIG. 9 is a cross sectional view taken along line B–B' shown in FIG. 7 and illustrating the MR head according to the first embodiment.
Figure 10:
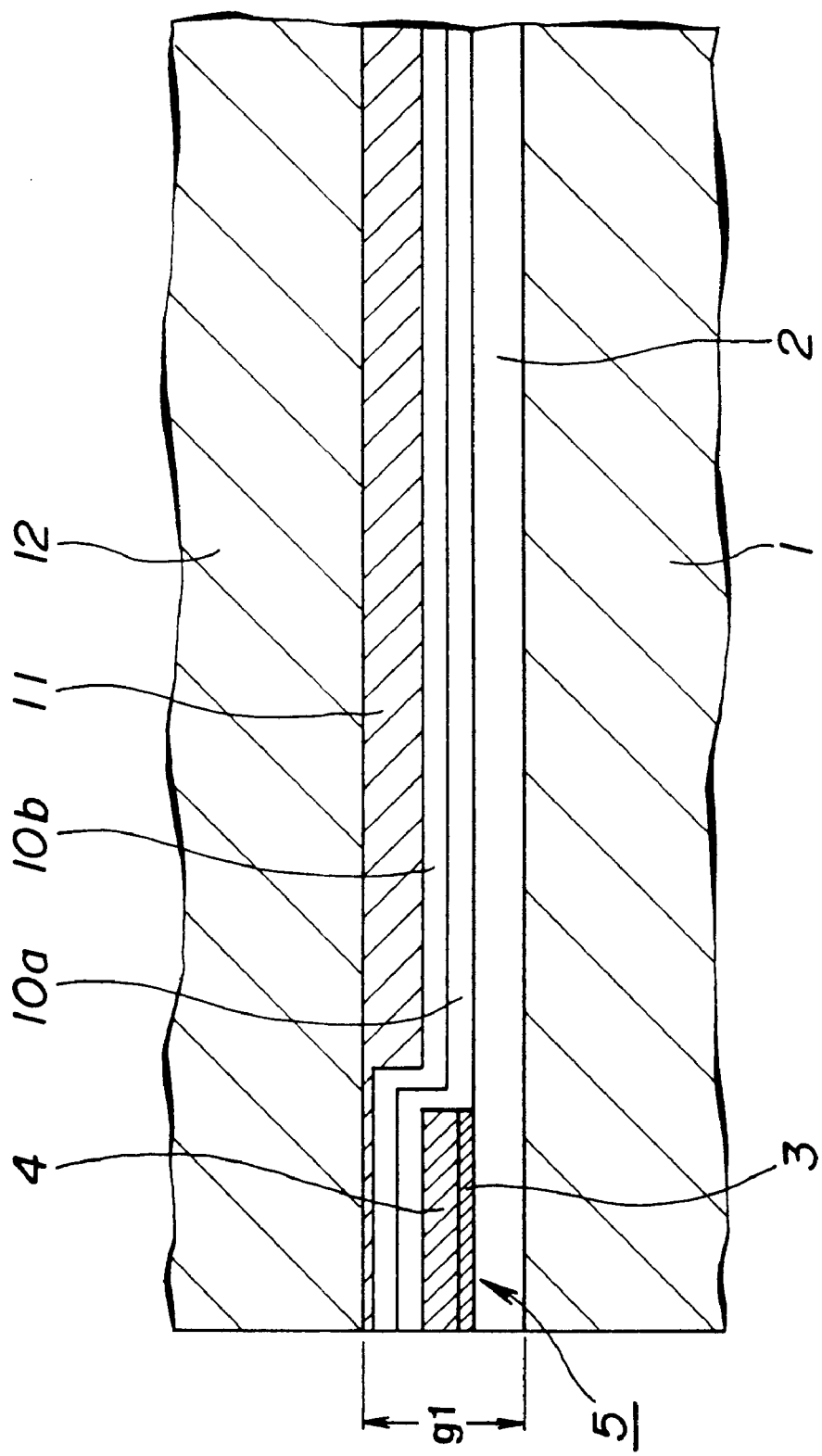
FIG. 10 is a cross sectional view taken along line C–C' shown in FIG. 7 and illustrating the MR head according to the first embodiment.

The structure of a MR head according to a first embodiment is shown in FIGS. 7 to 10. FIG. 7 is a plan view showing a pattern of a circuit in the MR head according to this embodiment. FIG. 8 is a cross sectional view taken along line A–A' shown in FIG. 7. FIG. 9 is a cross sectional view taken along line B–B' shown in FIG. 7. FIG. 10 is a cross sectional view taken along line C–C' shown in FIG. 7.

As shown in FIGS. 7 to 10, the MR head according to this embodiment has a MR device portion 5 consisting of a first soft magnetic substrate 1, an insulating layer 2 formed on the first soft magnetic substrate 1, a MR device 3 and a biasing conductor 4 formed on the insulating layer 2; a pair of conductors 6 and 7 extending from the two lengthwise directional ends of the MR device portion 5; a pair of second conductors 8 and 9 respectively connected to the pair of the first conductors 6 and 7; insulating layers 10a and 10b formed to cover the MR device portion 5, the first conductors 6 and 7 and the second conductors 8 and 9; and a second soft magnetic substrate 12 bonded to the upper surface of the insulating layer 10b by an adhesive agent 11.

The MR head according to this embodiment has a structure such that the MR device portion 5 is composed of the MR device 3 and the biasing conductor 4 formed on the MR device 3 to apply a bias magnetic field. The MR device portion 5 is disposed in such a manner that such that its lengthwise direction runs parallel to a surface M facing a recording medium. The MR device portion 5 is ground in such a manner that one of its ends are exposed to the surface M facing the recording medium.

The first conductors 6 and 7 extending from the two ends of the MR device portion 5 are, in a region from the end of the MR device portion 5 to reach the upper surface of the insulating layer 2, embedded in a groove formed in the insulating layer 10a in such a manner that the front ends of the first conductors 6 and 7 are exposed to the surface M facing the recording medium. On the other hand, the second conductors 8 and 9 connected to the first conductors 6 and 7 are laminated on the rear ends of the first conductors 6 and 7 in such a manner that the second conductors 8 and 9 are not exposed to the surface M facing the recording medium. The insulating layer 10b is formed on the first conductors 6 and 7 and the second conductors 8 and 9.

That is, as shown in FIG. 9, the MR head according to this embodiment has a structure such that the second conductor 8 is laminated on the rear end of the first conductor 6 embedded in the groove formed in the insulating layer 10a so that the first conductor 6 and the second conductor 8 are electrically connected to each other. Moreover, the insulating layer 10b is formed on the first conductor 6 and the second conductor 8. The insulating layer 10b is formed in such a manner that a connecting terminal 13 formed at the rear end of the second conductor 8 is exposed to the outside.

Similarly, the second conductor 9 is laminated on the rear end of the first conductor 7 embedded in the groove formed in the insulating layer 10a so that the first conductor 7 and the second conductor 9 are electrically connected to each other. Moreover, the insulating layer 10b is formed on the first conductor 7 and the second conductor 9. The insulating layer 10b is formed in such a manner that a connecting terminal 14 formed at the rear end of the second conductor 9 is exposed to the outside.

The first conductors 6 and 7 are made of metal having a high melting point and exhibiting excellent environment resistance. The reason for this is that the structure in which the first conductors 6 and 7 are exposed to the surface M facing the recording medium requires the excellent environment resistance. On the other hand, the second conductors 8 and 9 are made of conductive material having a specific resistance weaker than that of the first conductors 6 and 7. The reason for this is that the electric characteristics can be given priority to the environment resistance because the second conductors 8 and 9 are not exposed to the surface M facing the recording medium.

When an information is reproduced from the recording medium by using the MR head having the above-mentioned structure, sense electric currents are supplied from the connecting terminals 13 and 14 formed at the rear ends of the second conductors 8 and 9 to the MR device portion 5 through the second conductors 8 and 9 and the first conductors 6 and 7 so as to allow the sense electric currents to flow in the lengthwise direction of the MR device portion 5 along the surface M facing the recording medium. The sense electric currents are used to detect change in the resistance of the MR device portion 5 occurring attributable to the magnetic field formed from the recording medium so that the information signal is reproduced from the recording medium.

Note that the first soft magnetic substrate 1 and the second soft magnetic substrate 12 of the MR head according to this embodiment are formed in order to magnetically shield the MR device portion 5. Therefore, the overall body of each of the first soft magnetic substrate 1 and the second soft magnetic substrate 12 is not required to be made of the soft magnetic material. As a result, a structure may be employed in which a thin soft magnetic film is formed on a non-magnetic substrate or a magnetic substrate so as to serve as the first soft magnetic substrate 1 and the second soft magnetic substrate 12. Moreover, the thin soft magnetic film is allowed to face the MR device portion 5.

A method of manufacturing the MR head having the above-mentioned structure will now be described with reference to FIGS. 11 to 22. FIGS. 11 to 16 and FIG. 22 show the state of the cross sectional portion taken along line A–A' shown in FIG. 7 in the sequential order of the manufacturing processes. FIGS. 17 to 21 show the state of the cross sectional portion taken along line B–B' shown in FIG. 7 in the sequential order of the manufacturing processes.

Figure 11:
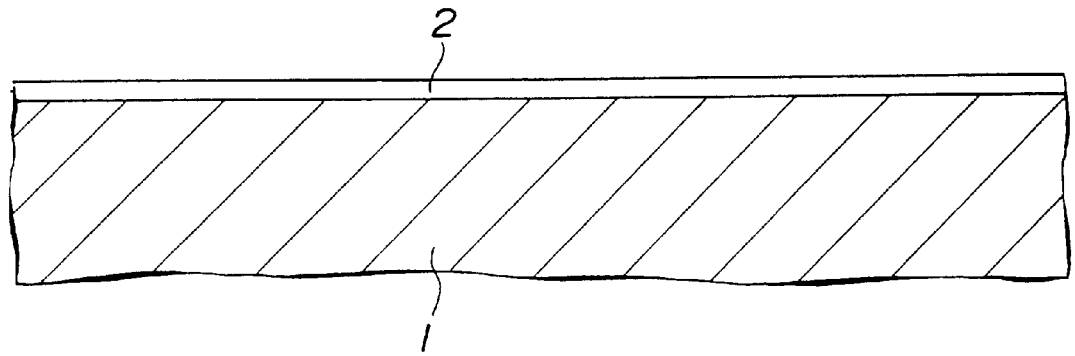
FIG. 11 is a cross sectional view taken along line A–A' shown in FIG. 7 and illustrating a state of the MR head according to the first embodiment during its manufacturing process.

When the above-mentioned MR head is manufactured, a first process is performed as shown in FIG. 11 such that the insulating layer 2 made of $Al_2O_3$ or $SiO_2$ (silicon oxide) is, by sputtering or the like, formed on the first soft magnetic substrate 1 made of polycrystal ferrite, such as Ni-Zn hematite, which is the soft magnetic material, in such a manner that the thickness of the insulating layer 2 is about 0.2 μm to about 0.3 μm. Since the surface of the insulating layer 2 is formed into the surface on which the MR device 3 will be formed in the post process, it is preferable that the surface roughness of the insulating layer 2 be improved. Therefore, after the insulating layer 2 has been formed, the surface of the insulating layer 2 is mirror-finished or subjected to surface treatment by using coating type $SiO_2$ called "Spin On Glass (SOG)".

Figure 12:
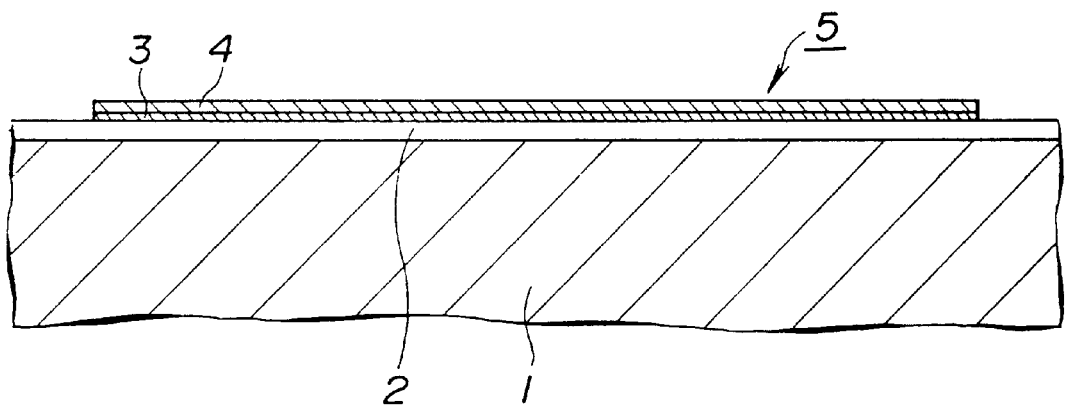
FIG. 12 is a cross sectional view taken along line A–A' shown in FIG. 7 and illustrating a state of the MR head according to the first embodiment during its manufacturing process.

Then, the MR device portion 5 is formed on the insulating layer 2, as shown in FIG. 12. The MR device portion 5 is, as described above, formed by laminating the MR device 3 and the biasing conductor 4 for applying a bias magnetic field to the MR device 3 in order to apply a DC bias magnetic field to the MR head by a so-called SAL bias method. When the MR device portion 5 is formed, the MR device 3 and the biasing conductor 4 are laminated by sputtering or evaporation. Then, the MR device 3 and the biasing conductor 4 are simultaneously etched into an elongated shape in such a manner that their lengthwise direction runs parallel to the surface M facing the recording medium. As a result, the MR device portion 5, the lengthwise direction of which runs parallel to the surface M facing the recording medium, is formed on the insulating layer 2.

The MR device 3 is made of, for example, a Ni—Fe alloy, while the biasing conductor 4 is made of a laminate of Ta and a Ni—Fe—Ta alloy. In this embodiment, the MR device 3 is made of a Ni—Fe alloy having a thickness of about 50 nm, while the biasing conductor 4 is made of a laminate of Ta having a thickness of about 10 nm and a Ni—Fe—Ta alloy having a thickness of about 50 nm. Therefore, the overall thickness of the MR device portion 5 of the MR head according to this embodiment is about 110 nm.

Note that the laminating order of the MR device 3 and the biasing conductor 4 may be reversed That is, the Ni—Fe—Ta alloy, Ta and the Ni—Fe alloy may be laminated in this sequentially order.

Figure 13:
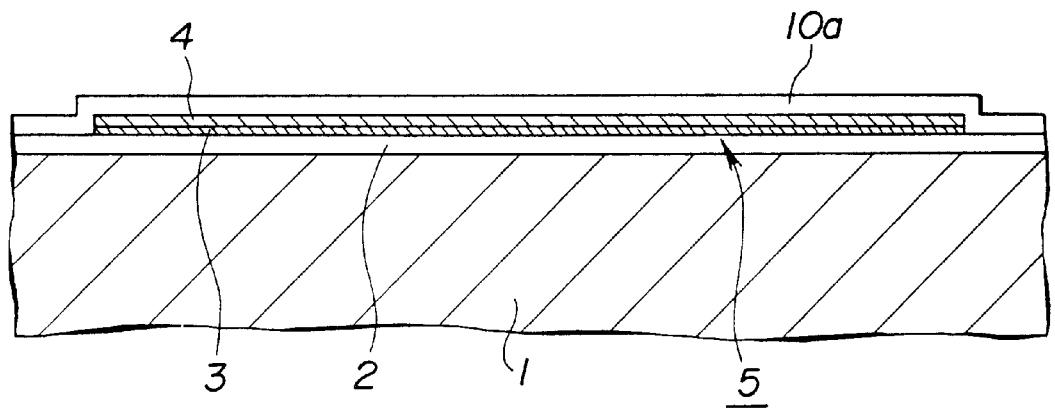
FIG. 13 is a cross sectional view taken along line A–A' shown in FIG. 7 and illustrating a state of the MR head according to the first embodiment during its manufacturing process.

Then, as shown in FIG. 13, the insulating layer 10a made of $Al_2O_3$, $SiO_2$ or the like is formed on the insulating layer 2 and the MR device portion 5 by sputtering or the like to have a thickness of about 0.1 μm. Note that the insulating layer 10a may be made of insulating material, such as NiO, having antiferromagnetism. When the insulating layer 10a is made of the insulating material having the antiferromagnetism, the magnetic stability of the MR device 3 can be improved thanks to the antiferromagnetic binding between the insulating layer 10a and the MR device 3.

Figure 14:
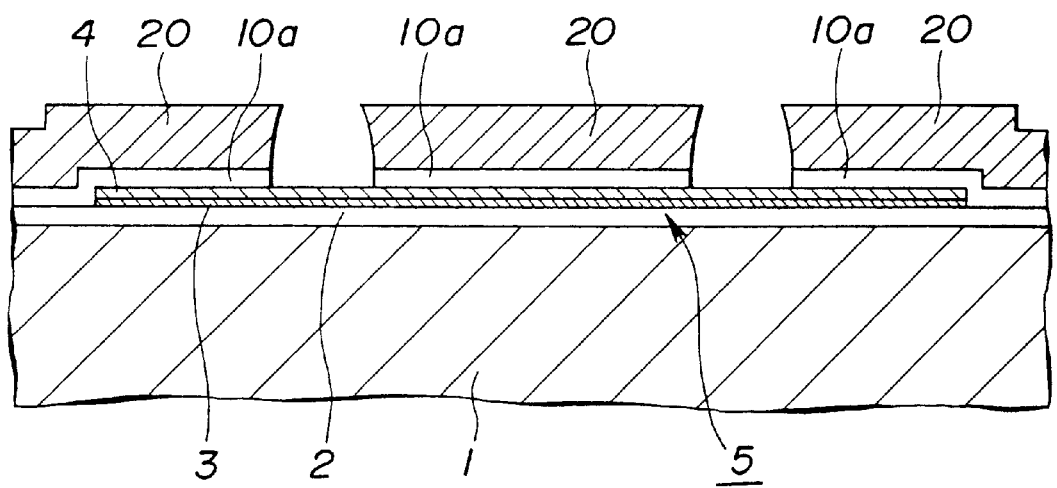
FIG. 14 is a cross sectional view taken along line A–A' shown in FIG. 7 and illustrating a state of the MR head according to the first embodiment during its manufacturing process.

Then, two grooves are formed in the insulating layer 10a in a direction substantially perpendicular to the medium sliding surface in order to expose the two portions of the MR device portion 5. The grooves are formed as shown in FIG. 14 such that a resist 20 having an inversely tapered openings corresponding to the grooves is formed on the insulating layer 10a and then the resist 20 is used as a mask when the insulating layer 10a is etched by ion milling or the like. The grooves are formed for the purpose of embedding the first conductors 6 and 7 in the following process, the first conductors 6 and 7 being arranged to supply the sense electric currents to the MR device portion 5.

Figure 15:
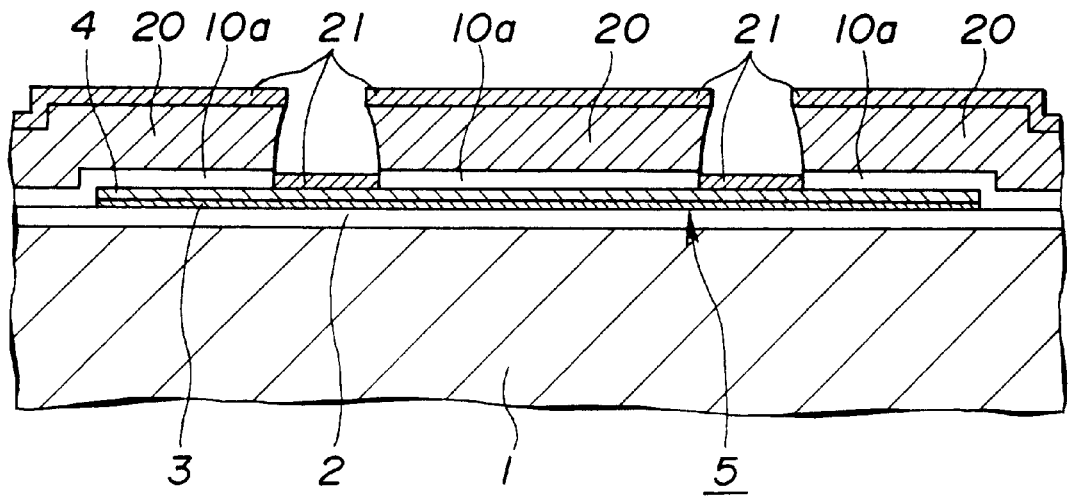
FIG. 15 is a cross sectional view taken along line A–A' shown in FIG. 7 and illustrating a state of the MR head according to the first embodiment during its manufacturing process.

Then, as shown in FIG. 15, the conductive films 21, which are formed into the first conductors 6 and 7, are formed on the overall surface by sputtering or the like. As a result, the conductive films 21 are formed in the grooves formed in the insulating layer 10a and also formed on the resist 20. The thickness of the conductive film 21 is made to be the same as that of the insulating layer 10a or smaller than the same. Since the first conductors 6 and 7 must have excellent environment resistance as described above, the conductive film 21 is made of Cr, Ti, Ta, W, Mo or the like which is metal having excellent environment resistance and a high melting point or their alloys.

Then, the resist 20 is separated by using organic solvent or the like. As a result, the conductive film 21 formed on the resist 20 is removed together with the resist 20. Thus, the conductive films 21 are retained only in the grooves, that is, only the portions embedded in the insulating layer 10a are retained. The retained portions are formed into the first conductors 6 and 7. Since the first conductors 6 and 7 have the thickness which is smaller than that of the insulating layer 10a, they do not affect the shield gap distance g1.

The above-mentioned method in which unnecessary portions are masked with the resists and the masks are then separated to form a required pattern is called a "lift off method".

Since the sense electric current, which is supplied to the MR device portion 5, flows between the two first conductors 6 and 7, an effective portion, from which the magnetic field from the recording medium is detected, is only the portion between the two first conductors 6 and 7. As a result, distance T1 from the first conductor 6 to the first conductor 7 is the width of the track of the MR head. Therefore, the pair of the first conductors 6 and 7 are formed in such a manner that the distance from the first conductor 6 to the first conductor 7 is made to be a required width of the track.

After the first conductors 6 and 7 have been formed as described above, the second conductors 8 and 9 are formed by the lift off method similarly to the first conductors 6 and 7. The process for manufacturing the second conductors will be described with reference to FIGS. 17 to 20 which are cross sectional views taken along line B–B' shown in FIG. 7. FIG. 17 corresponds to FIG. 16 and shows the state after the first conductors 6 and 7 have been formed.

Figure 16:
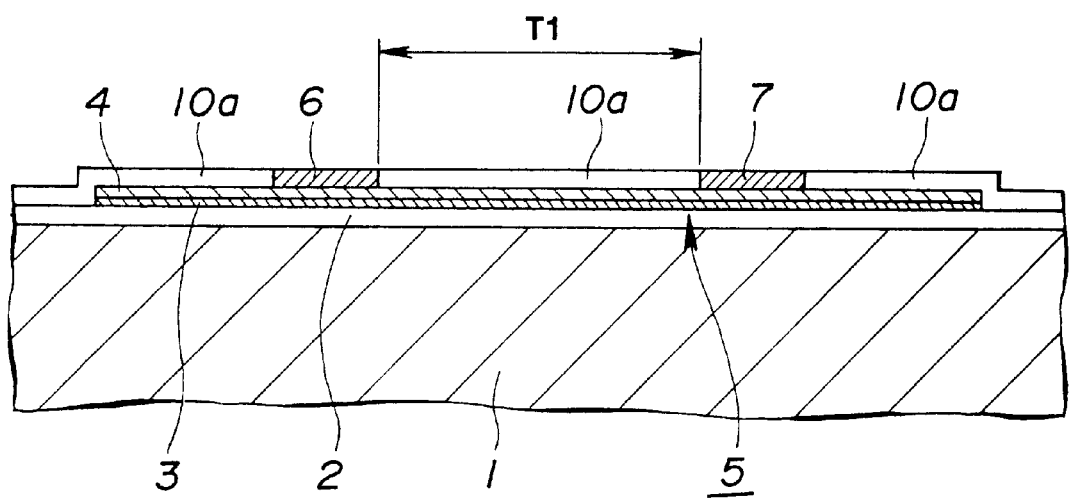
FIG. 16 is a cross sectional view taken along line A–A' shown in FIG. 7 and illustrating a state of the MR head according to the first embodiment during its manufacturing process.
Figure 17:
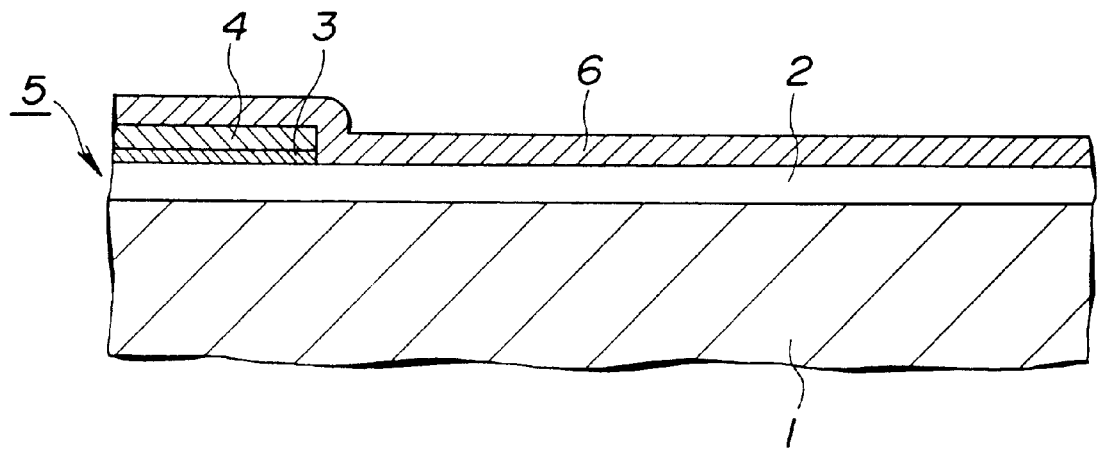
FIG. 17 is a cross sectional view taken along line B–B' shown in FIG. 7 and illustrating a state of the MR head according to the first embodiment during its manufacturing process.
Figure 18:
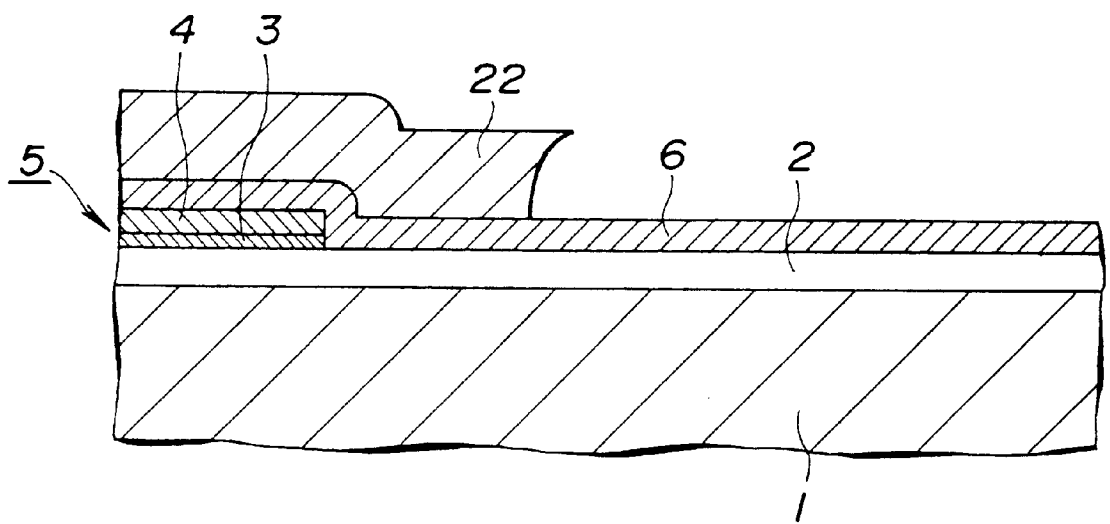
FIG. 18 is a cross sectional view taken along line B–B' shown in FIG. 7 and illustrating a state of the MR head according to the first embodiment during its manufacturing process.

When the second conductors 8 and 9 are formed, the first conductors 6 and 7 are formed as shown in FIGS. 16 and 17 and then the resist 22 is formed as shown in FIG. 18. The resist 22 is formed in such a manner that openings are formed to correspond to the rear ends of the first conductors 6 and 7 and the resist 22 fully covers the other portions. The openings of the resist 22 are formed in such a manner that the edge portions of the openings are inversely tapered.

Figure 19:
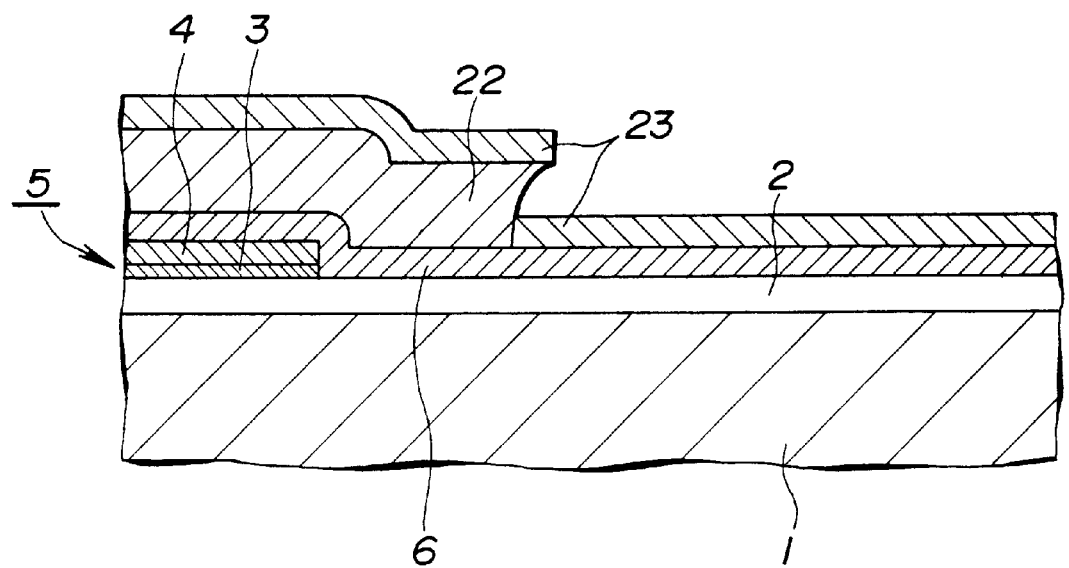
FIG. 19 is a cross sectional view taken along line B–B' shown in FIG. 7 and illustrating a state of the MR head according to the first embodiment during its manufacturing process.

Then, as shown in FIG. 19, a conductive film 23 for forming the second conductors 8 and 9 is formed on the overall surface by sputtering or the like. Since the edge portion of the resist 22 is inversely tapered, the conductive film 23 formed in the opening of the resist 22 and the conductive film 23 formed on the resist 22 are not connected to each other, that is, they are completely separated from each other, as shown in FIG. 19. It is preferable that the second conductors 8 and 9 be made of the conductive material having small specific resistance as described above. Therefore, the conductive film 23 for forming the second conductors 8 and 9 is made of Cu, Ag or Au type material or a laminate formed by laminating the foregoing conductive material on a base film made of Ti or the like.

As described above, the conductive film 23 is formed in such a manner that its thickness is smaller than that of the MR device portion 5. Since the MR head according to this embodiment has the structure such that the thickness of the MR device portion 5 is about 110 nm, the thickness of the conductive film 23 is made to be smaller than 110 nm.

The shapes of the second conductors 8 and 9 are required to be connected to the first conductors 6 and 7. That is, the patterns of the second conductors 8 and 9 may be formed into shapes which coincide with the rear ends of the first conductors 6 and 7. As an alternative to this, the patterns may be formed into wide shapes capable of covering the rear ends of the first conductors 6 and 7. The patterns may be narrower than those of the rear ends of the first conductors 6 and 7. In this embodiment, the second conductors 8 and 9 are formed into shapes, the width of each of which is smaller than the width of each of the first conductors 6 and 7, as shown in FIG. 7.

Figure 20:
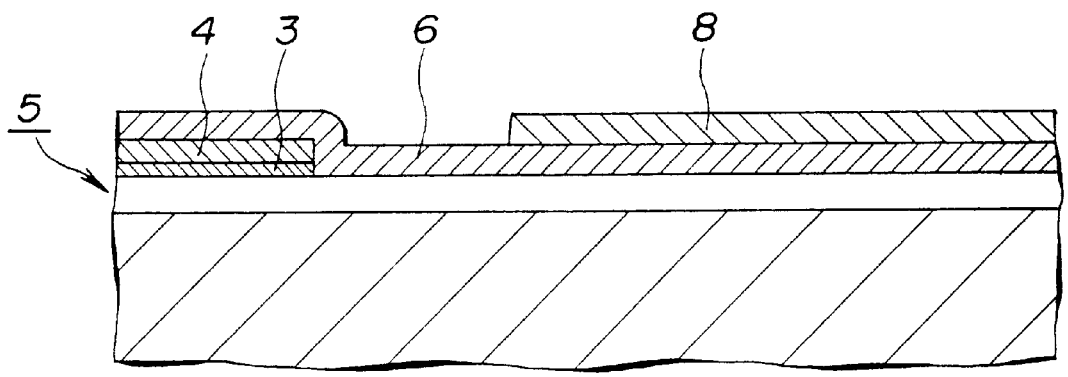
FIG. 20 is a cross sectional view taken along line B–B' shown in FIG. 7 and illustrating a state of the MR head according to the first embodiment during its manufacturing process.

Then, as shown in FIG. 20, the second conductors 8 and 9 are formed into predetermined shapes by the lift off method. That is, organic solvent is used to remove the resist 22 together with the conductive film 23 formed on the resist 22. Since the second conductors 8 and 9 formed in the openings of the resist 22 and the second conductors 8 and 9 formed on the resist 22 are completely separated from each other, the edge portions of the second conductors 8 and 9 formed in the openings of the resist 22 are not disordered and only the conductive film 23 formed on the resist 22 can reliably be removed.

As a result of the above-mentioned process, the second conductors 8 and 9 are formed on the first conductors 6 and 7.

Each of the second conductors 8 and 9 has a thickness smaller than that of the MR device portion 5. Therefore, the thickness of a portion in which the first conductor 6 and the second conductor 8 are laminated and the thickness of the portion in which the first conductor 7 and the second conductor 9 are laminated are smaller than the thickness of a portion in which the MR device portion 5 and the first conductor 6 are laminated and the thickness of a portion in which the MR device portion 5 and the first conductor 7 are laminated. As a result, the portions, in which the second conductors 8 and 9 are formed, are made to be lower than the portions on the MR device portion 5 in which the first conductors 6 and 7 are formed. Therefore, the second conductors 8 and 9 do not affect the shield gap distance g1.

Figure 21:
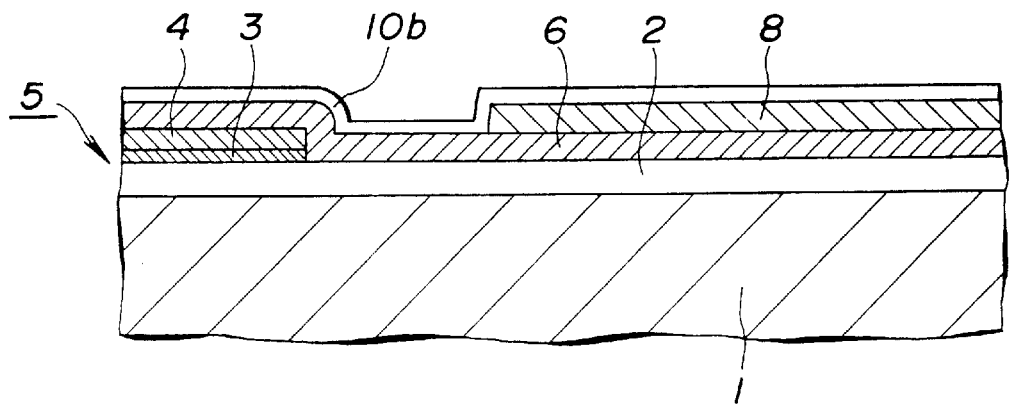
FIG. 21 is a cross sectional view taken along line B–B' shown in FIG. 7 and illustrating a state of the MR head according to the first embodiment during its manufacturing process.
Figure 22:
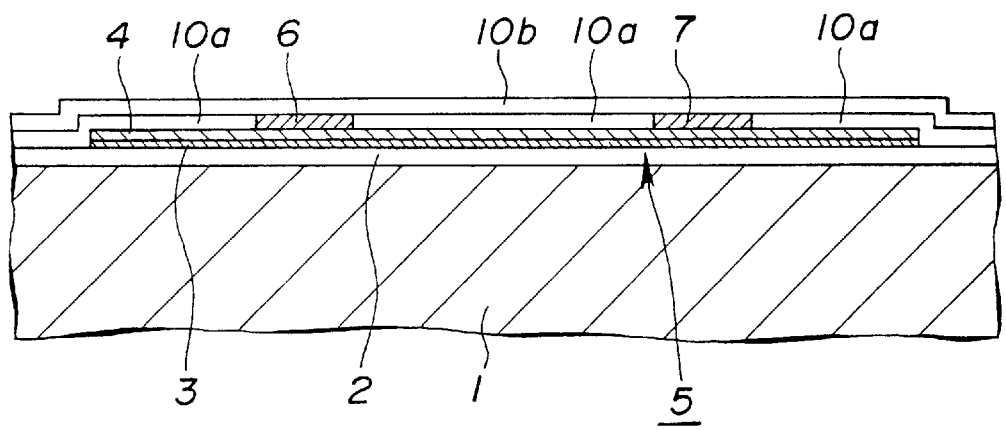
FIG. 22 is a cross sectional view taken along line A–A' shown in FIG. 7 and illustrating a state of the MR head according to the first embodiment during its manufacturing process.

Then, the insulating layer 10b made of $Al_2O_3$ or $SiO_2$ is, as shown in FIGS. 21 and 22, formed on the MR device portion 5, the insulating layer 10a, the first conductors 6 and 7 and the second conductors 8 and 9 by sputtering or the like to have a thickness of about 0.1 μm. The insulating layer 10b is formed for the purpose of protecting the first conductors 6 and 7 and the second conductors 8 and 9 from static electricity and corrosion.

The highest portion with respect to the main surface of the first soft magnetic substrate 1 is the portion in which the insulating layer 10a and the insulating layer 10b are formed on the MR device portion 5. Therefore, the shield gap distance g1 is determined by the MR device portion 5, composed of the insulating layer 2 formed on the first soft magnetic substrate 1, the MR device 3 and the biasing conductor 4, and the insulating layer 10a and the insulating layer 10b formed on the MR device portion 5. That is, the MR head according to this embodiment has the structure such that the first conductors 6 and 7 and the second conductors 8 and 9 do not affect the shield gap distance g1.

Then, the portions of the rear ends of the second conductors 8 and 9 are exposed to serve as the electrodes for establishing the connection with the outside by completely removing the insulating layer 10b formed on the rear ends of the second conductors 8 and 9 by etching and by bonding the second soft magnetic substrate 12 to the upper surface of the insulating layer 10b by using an adhesive agent. In this process, the second soft magnetic substrate 12 is joined up in such a manner that the rear ends of the second conductors 8 and 9 are exposed.

After the above-mentioned process has been completed, a post process is performed which includes a grinding process for grinding the surface M facing the recording medium for exposing the MR device 3 to the surface M facing the recording medium and a terminal forming process for forming the connecting terminals 13 and 14 for establishing the connection with the outside in the electrode portions at the rear ends of the second conductors 8 and 9. As a result, the MR head according to this embodiment is manufactured. Since the MR head according to this embodiment has the structure such that the first conductors 6 and 7 and the second conductors 8 and 9 do not affect the shield gap distance g1 as described above, the width of the shield gap distance g1 can be reduced.

Second Embodiment

In general, the MR head suffers from a problem in that Barkhausen noise is generated attributable to movement of the magnetic domain wall in the MR device. As a method of eliminating the Barkhausen noise, a method has been known in which the MR device is formed into a single magnetic domain by applying a magnetic field to the MR device. Therefore, a MR head according to this embodiment has a structure arranged such that magnetic layers are formed at the two ends of the MR device and the magnetic layers apply magnetic fields to the MR device.

Figure 23:
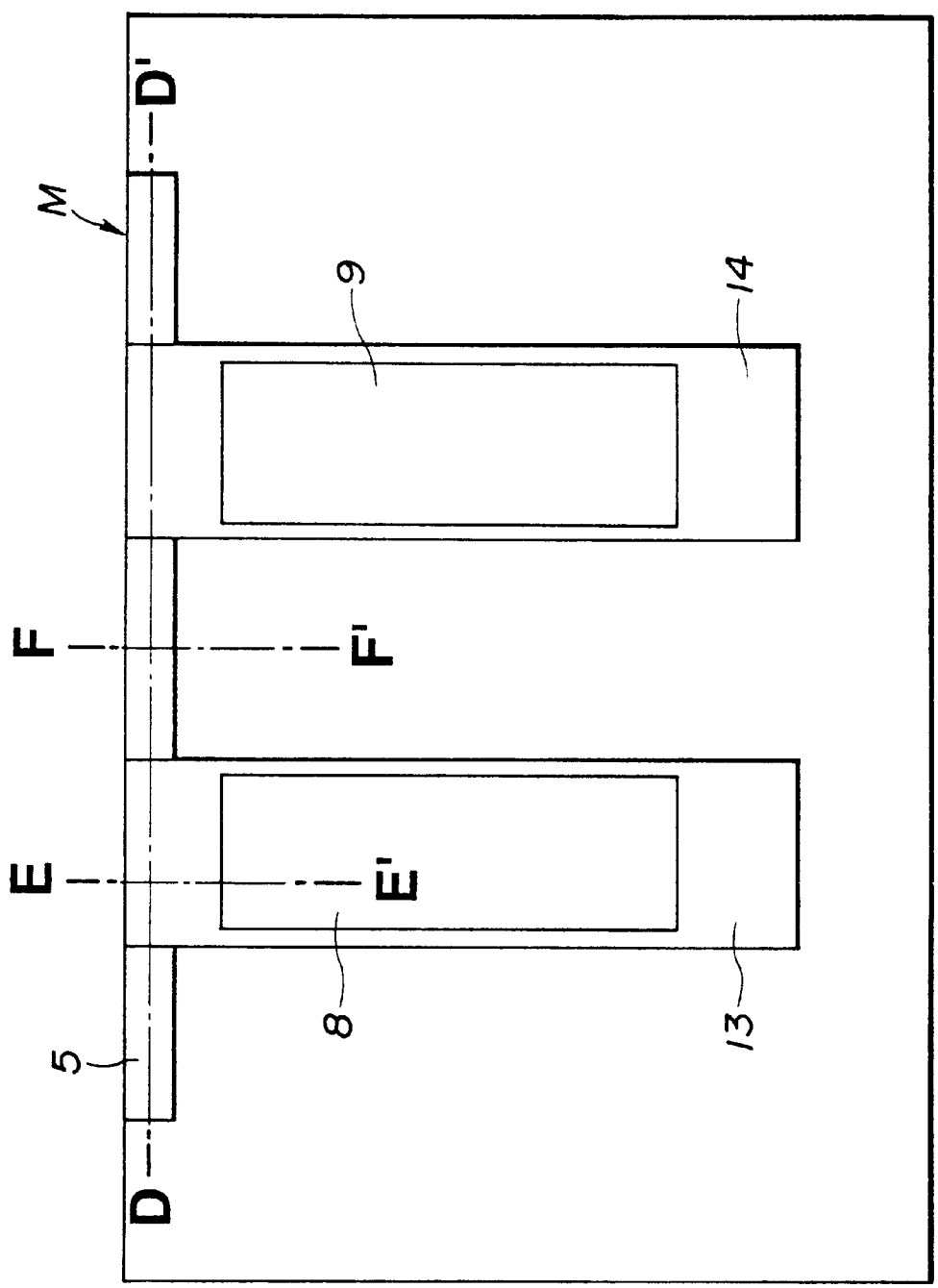
FIG. 23 is a plan view schematically showing a pattern of a circuit in a MR head according to the second embodiment.
Figure 24:
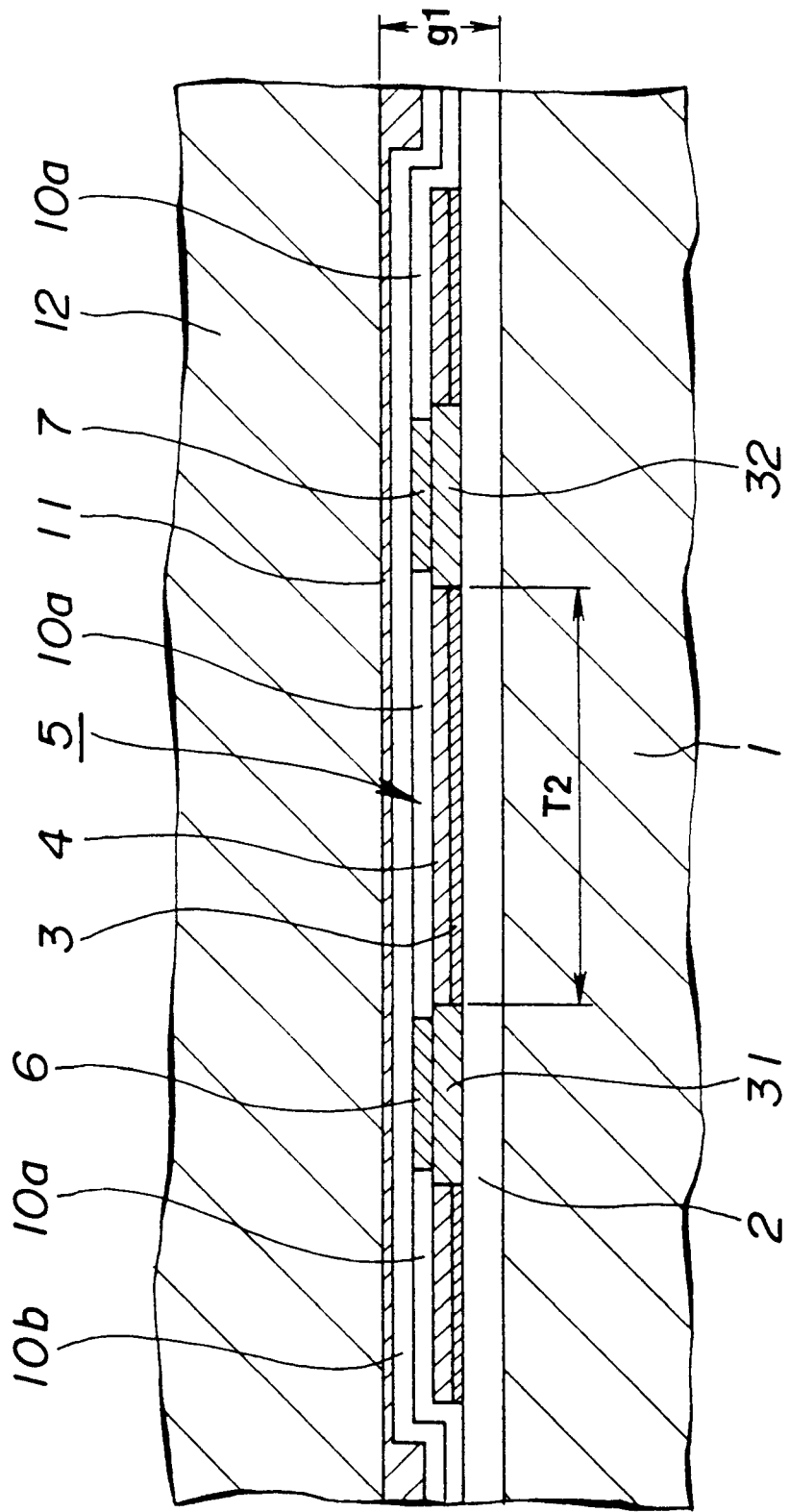
FIG. 24 is a cross sectional view taken along line D–D' shown in FIG. 23 and illustrating the MR head according to the second embodiment.
Figure 25:
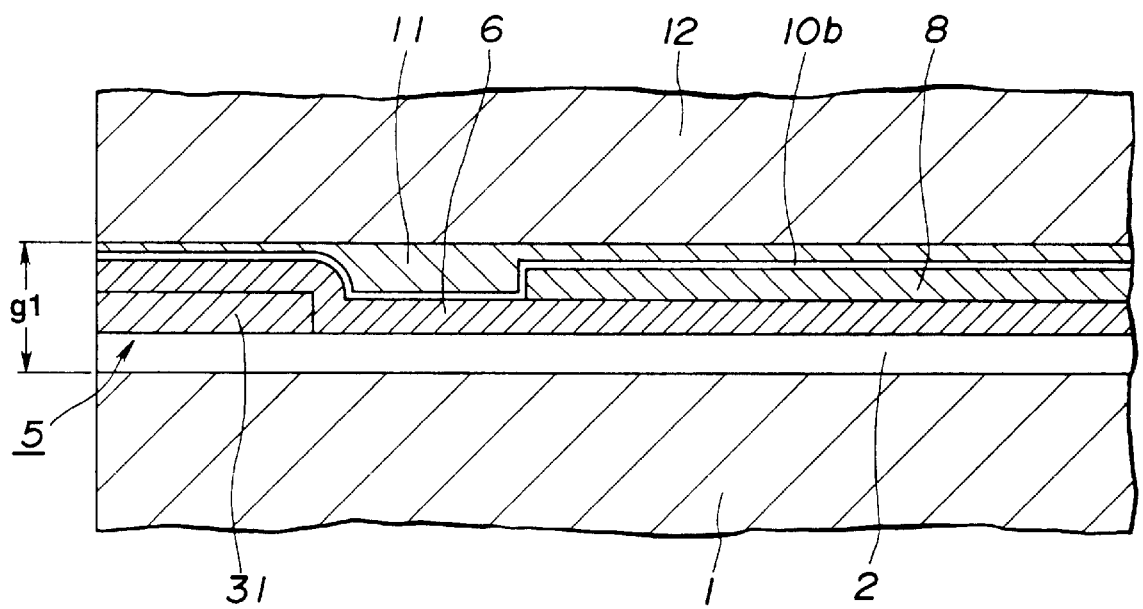
FIG. 25 is a cross sectional view taken along line E–E' shown in FIG. 23 and illustrating the MR head according to the second embodiment.
Figure 26:
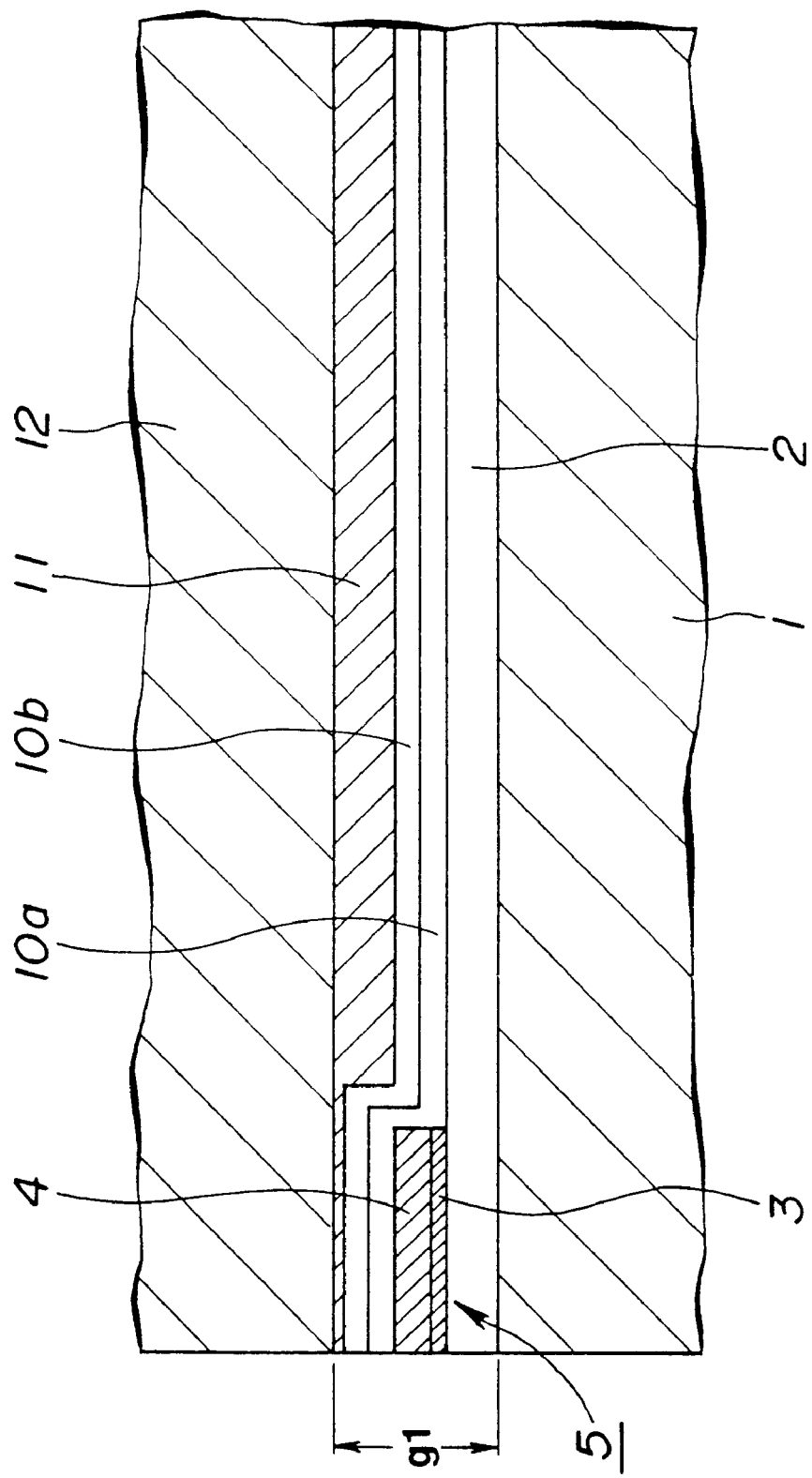
FIG. 26 is a cross sectional view taken along line F–F' shown in FIG. 23 and illustrating the MR head according to the second embodiment.

The structure of the MR head according to this embodiment is shown in FIGS. 23 to 26. FIG. 23 is a plan view showing a pattern of a circuit in the MR head according to this embodiment. FIG. 24 is a cross sectional view taken along line D–D' shown in FIG. 23. FIG. 25 is a cross sectional view taken along line E–E' shown in FIG. 23. FIG. 26 is a cross sectional view taken along line F–F' shown in FIG. 23. Similar elements to those of the MR head according to the first embodiment are given the same reference numerals.

As shown in FIGS. 23 to 26, the MR head according to this embodiment has a structure arranged such that magnetic layers 31 and 32 are formed at the two ends of the MR device portion 5 formed by laminating the MR device 3 on the biasing conductor 4, that is, below the first conductors 6 and 7.

Each of the magnetic layers 31 and 32 has a triple-layered structure formed by laminating a conductive film having a thickness of about 10 nm and made of Cr, a ferromagnetic film made of hard magnetic material, such as a Co material, having a large coercive force and a conductive film made of Cr.

The conductive film formed below the ferromagnetic film serves as the ground for the ferromagnetic film in order to enlarge the coercive force of the ferromagnetic film. The ferromagnetic film is formed to make the MR device to be single magnetic domain, the ferromagnetic film being made of, for example, a ferromagnetic alloy, such as Co—Cr, Co—Cr—Pt or Co—Ni—Pt. The conductive film formed on the ferromagnetic film is arranged to prevent oxidation of the ferromagnetic film during the process for forming the MR head. Moreover, the conductive film protects the ferromagnetic film from etching damage when the groove is formed in the insulating layer 10a which is formed on the magnetic layers 31 and 32.

The MR head according to this embodiment has a structure similar to that of the MR head according to the first embodiment except for the above-mentioned structure having the magnetic layers 31 and 32. In the MR head according to this embodiment, the influences of the magnetic fields from the magnetic layers 31 and 32 makes the MR device 3 to be a single magnetic domain so that generation of Barkhausen noise attributable to movement of the magnetic domain wall in the MR device 3 is prevented.

Since the magnetic layers 31 and 32 have conductivity, the sense electric currents are, in the MR head, supplied from the first conductors 6 and 7 to the MR device portion 5 through the magnetic layers 31 and 32. Therefore, the portion for effectively detecting the magnetic field from the recording medium is, in the MR device portion 5, the portion between the magnetic layer 31 and the magnetic layer 32. That is, the MR head is structured such that the distance T2 between the magnetic layer 31 and the magnetic layer 32 is the width of the track. Therefore, the width of the track is limited by the magnetic layers 31 and 32.

Figure 27:
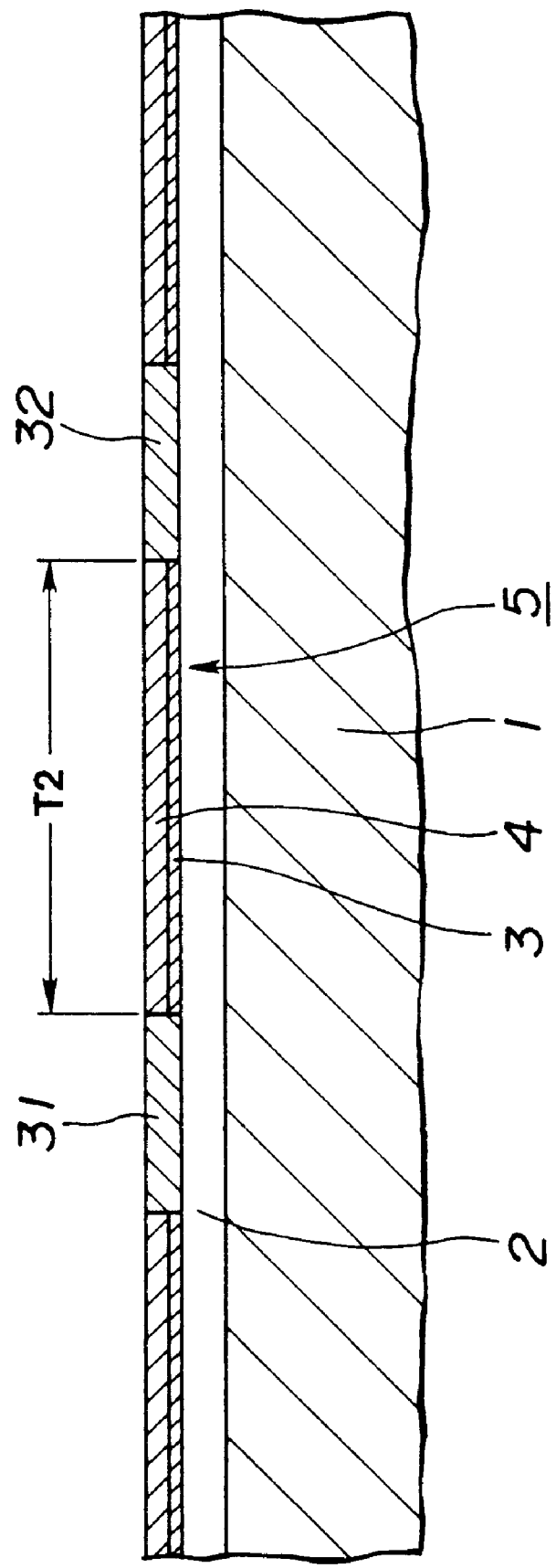
FIG. 27 is a cross sectional view taken along line D–D' shown in FIG. 23 and illustrating the MR head according to the second embodiment.
Figure 28:
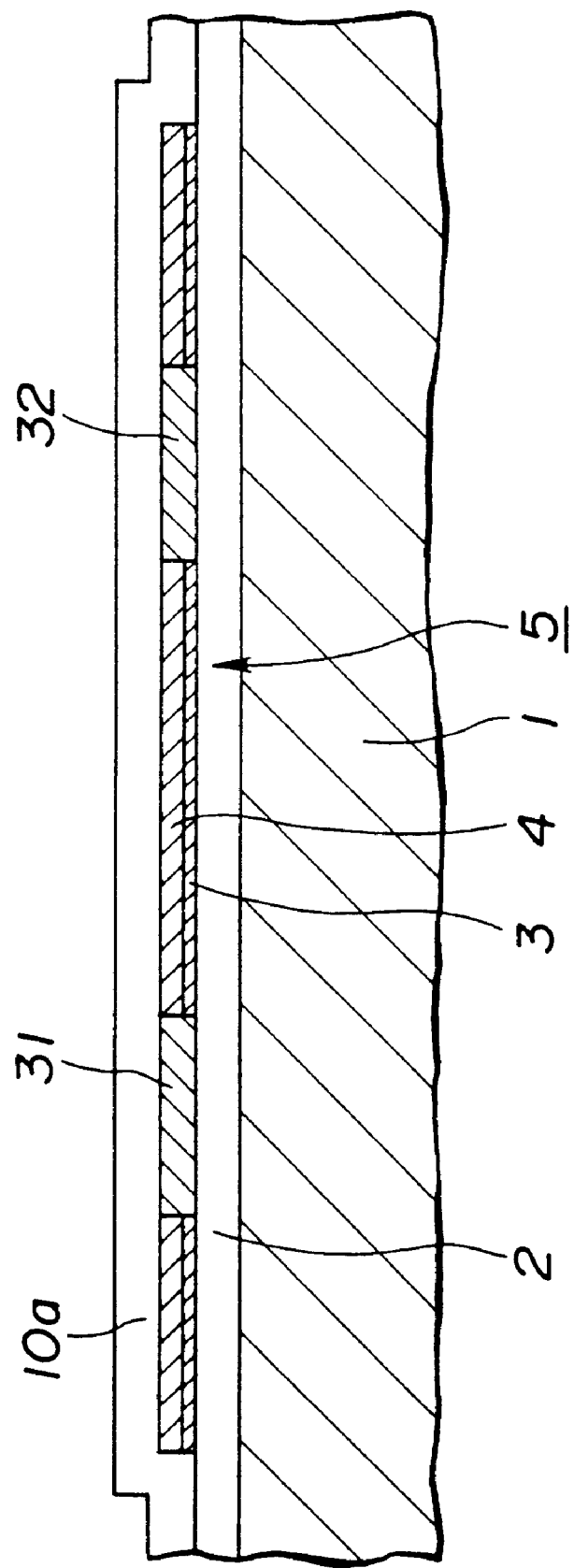
FIG. 28 is a cross sectional view taken along line D–D' shown in FIG. 23 and illustrating a state of the MR head according to the second embodiment during its manufacturing process.
Figure 29:
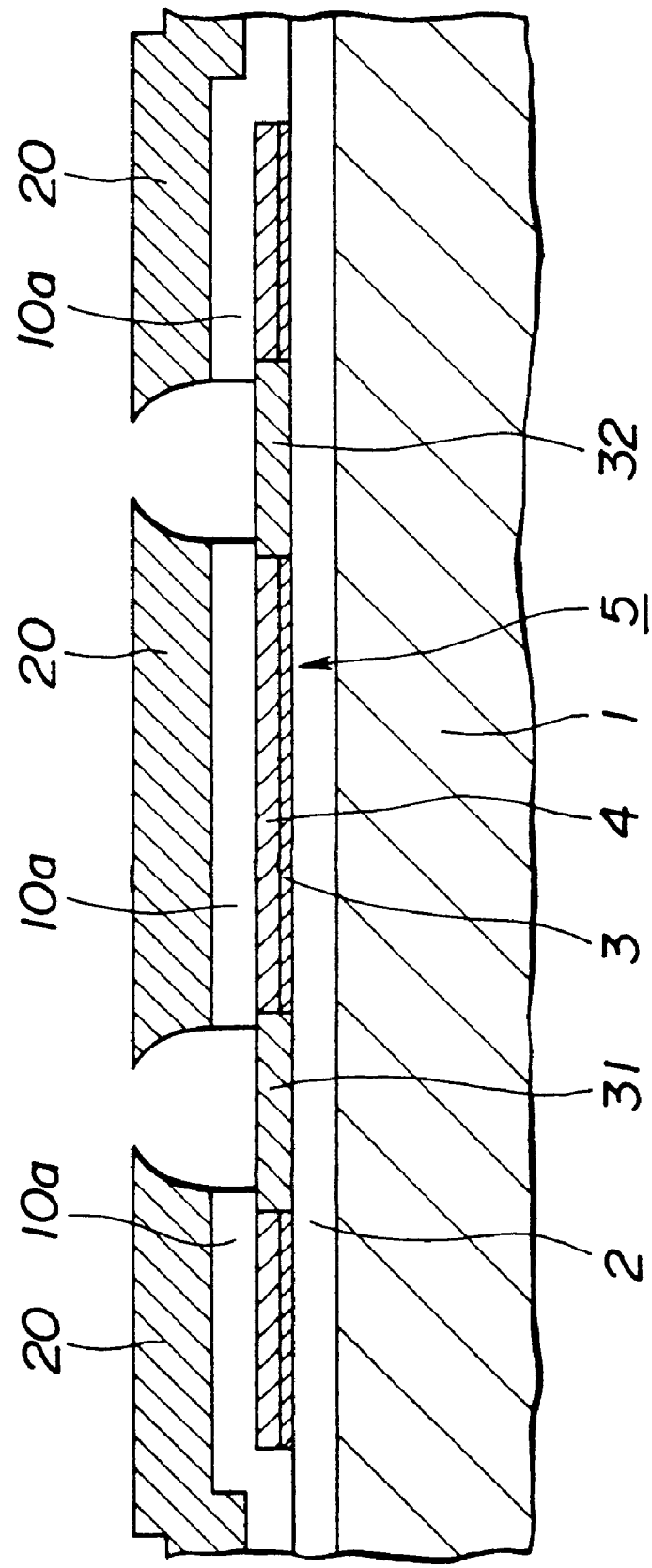
FIG. 29 is a cross sectional view taken along line D–D' shown in FIG. 23 and illustrating a state of the MR head according to the second embodiment during its manufacturing process.

A method of manufacturing the MR head having the above-mentioned structure will now be described with reference to FIGS. 27 to 29. FIGS. 27 to 29 show the state of the cross section taken along line D–D' shown in FIG. 23 in the sequential order of the manufacturing processes. The method of manufacturing the MR head according to this embodiment is similar to that for manufacturing the MR head according to the first embodiment except for an arrangement in which the magnetic layers 31 and 32 are formed prior to forming the first conductors 6 and 7.

When the MR head according to this embodiment is manufactured, the insulating layer 2 is formed on the first soft magnetic substrate 1, and then the MR device portion 5 is formed on the insulating layer 2, similarly to the first embodiment. In this embodiment, the above-mentioned magnetic layers 31 and 32 are formed at the two ends of the portions which are formed into the magnetism sensing portions of the MR device portion 5, as shown in FIG. 27. As described above, the distance T2 between the magnetic layer 31 and the magnetic layer 32 is the width of the track of the MR head. Therefore, the magnetic layers 31 and 32 are formed in such a manner that the distance from the magnetic layer 31 to the magnetic layer 32 is made to be a required width for the track.

Then, as shown in FIG. 28, the insulating layer 10a made of $Al_2O_3$ or $SiO_2$ is formed on the insulating layer 2, the MR device portion 5 and the magnetic layers 31 and 32 to have a thickness of about 0.1 µm. Note that the insulating layer 10a may be made of insulating material, such as NiO, having antiferromagnetism.

Then, two grooves are formed in the insulating layer 10a in a direction substantially perpendicular to the direction in which the medium slides in such a manner that portions of the magnetic layers 31 and 32 are exposed. The grooves are formed as shown in FIG. 29 such that a resist 20 having an inversely tapered openings corresponding to the grooves is formed on the insulating layer 10a and then the resist 20 is used as a mask when the insulating layer 10a is etched by ion milling or the like. The uppermost layer of each of the magnetic layers 31 and 32 is a conductive film made of Cr. These conductive films protect the ferromagnetic films in the magnetic layers 31 and 32. Therefore, the ferromagnetic films in the magnetic layers 31 and 32 are not damaged during the above-mentioned etching process.

If the MR device portion 5 is damaged during the etching process, it is made to be magnetically instable and Barkhausen noise is generated when the magnetoresistance effect magnetic head is operated. Therefore, when the above-mentioned grooves are formed, the opening, which is formed in the resist 20, is formed to have a width smaller than the width of each of the magnetic layers 31 and 32 in order to prevent exposure of the MR device portion 5. When the structure is arranged such that the MR device portion 5 is not exposed, the MR device portion 5 can be protected from etching damage during the process for etching the insulating layer 10a. As a result, generation of Barkhausen noise attributable to the etching damage can be prevented.

Then, a process similar to that according to the first embodiment is performed so that the MR head according to this embodiment is manufactured.

As can be understood from the foregoing description, the structure according to the present invention in which the conductor connected to the magnetoresistance effect magnetic device is embedded in the insulating layer enables the shield gap distance to be shortened. Therefore, according to the present invention, a MR head having an excellent frequency characteristic and capable of preventing generation of noise can be provided.

Since the present invention has the structure arranged such that the conductor connected to the magnetoresistance effect magnetic device is embedded in the insulating layer, the process for etching the insulating layer formed on the conductor is not required when the shield gap distance is attempted to be shortened. That is, the present invention is able to reduce the number of processes for manufacturing the MR head even if the shield gap distance is shortened. Therefore, the present invention enables a MR head having a satisfactory frequency characteristic and capable of preventing generation of noise to be manufactured with a low cost.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A magnetoresistance effect magnetic head comprising:
    a first soft magnetic material substrate having oppositely facing front and rear edges;
    a first insulating layer formed on said first soft magnetic substrate;
    an MR head device portion positioned at a medium facing surface of the head at said front edge of said substrate and having an MR device and a biasing conductor positioned on said insulating layer in that order;
    a pair of first conductors formed spaced apart from each other and extending from said medium facing surface toward said rear edge and over said MR device portion so as to be exposed at said medium facing surface;
    a pair of second conductors, each of which is laminated on a rear portion of a respective one of said first conductors, each second conductor extending along its respective first conductors but being shorter than its first conductor so as not to be exposed at the medium facing surface, said second conductors having a thickness less than that of the MR device, a combined thickness of a given first conductor and second conductor being less than a combined thickness of that first conductor and said MR device;

a second insulating layer formed over said MR device portion and beside said first conductors, said second insulating layer having a thickness greater or equal to that of said first conductors; and a third insulating layer formed over said second insulating layer and said first and second conductors, a second soft magnetic material substrate bonded to an upper surface of said third insulating layer, wherein, said first conductors are embedded in grooves formed in the second insulating layer which extend from said first edge toward said rear edge and which extend up to said third insulating layer; and said first and second conductors having the same thickness.

2. A magnetoresistance effect magnetic head according to claim 1, wherein said second conductors are characterized by a resistance that is weaker than that of said first conductor.

3. A magnetoresistance effect magnetic head according to claim 1, wherein hard magnetic layers are formed at two ends of said magnetoresistance effect magnetic device.

4. A magnetoresistance effect magnetic head according to claim 3, wherein said hard magnetic layers have conductivity and the distance from one of said magnetic layers to the other magnetic layer determines the width of a track.

5. The magnetoresistance effect magnetic head of claim 1, wherein said second soft magnetic material substrate is bonded to said second insulating layer with adhesive.

* * * * *